United States Patent
Yang

(10) Patent No.: US 10,802,564 B2
(45) Date of Patent: Oct. 13, 2020

(54) METHOD AND SYSTEM FOR CHASSIS VOLTAGE DROP COMPENSATION

(71) Applicant: QUANTA COMPUTER INC., Taoyuan (TW)

(72) Inventor: Chih-Wei Yang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 214 days.

(21) Appl. No.: 16/155,574

(22) Filed: Oct. 9, 2018

(65) Prior Publication Data

US 2020/0110454 A1 Apr. 9, 2020

(51) Int. Cl.
| G06F 1/30 | (2006.01) |
| H02J 1/10 | (2006.01) |
| G06N 3/08 | (2006.01) |
| H02H 1/00 | (2006.01) |
| H02H 9/00 | (2006.01) |
| H02J 7/34 | (2006.01) |

(52) U.S. Cl.
CPC .............. G06F 1/30 (2013.01); G06F 1/305 (2013.01); G06N 3/08 (2013.01); H02H 1/0092 (2013.01); H02H 9/004 (2013.01); H02J 1/10 (2013.01); H02J 7/34 (2013.01)

(58) Field of Classification Search
CPC .. G06F 1/26; G06F 1/30; G06F 1/305; G06N 3/08; H02H 1/0092; H02H 9/004; H02J 1/10; H02J 7/34
USPC ..................................................... 323/909
See application file for complete search history.

(56) References Cited

U.S. PATENT DOCUMENTS

| 4,635,057 | A | * | 1/1987 | Schaefer | ................ G01R 17/06 323/909 |
| 5,508,603 | A | * | 4/1996 | Strong, III | ............. G05F 1/613 323/234 |
| 6,181,027 | B1 | * | 1/2001 | Grady | ....................... H02J 1/00 307/31 |
| 6,233,692 | B1 | | 5/2001 | Villanueva | |
| 9,118,245 | B2 | * | 8/2015 | Isham | ....................... G06F 1/26 |
| 2010/0148738 | A1 | * | 6/2010 | Schiff | .................. H02M 3/157 323/282 |

(Continued)

FOREIGN PATENT DOCUMENTS

| CN | 104978003 A | 10/2015 |
| TW | 201546595 A | 12/2015 |

OTHER PUBLICATIONS

TW Office Action for Application No. 108104684, dated Aug. 22, 2019, w/ First Office Action Summary.

(Continued)

*Primary Examiner* — Gary L Laxton
(74) *Attorney, Agent, or Firm* — Nixon Peabody LLP

(57) ABSTRACT

A system and method for compensating for voltage drops in a device having a remote node is disclosed. A power supply unit has an adjustable voltage output and a feedback circuit. A power path is coupled to the power supply unit to supply voltage to the remote node. A switch has an output coupled to the feedback circuit, a first input coupled to the power path, and a second input coupled to the remote node. A controller is coupled to the switch. The controller is operable to control the switch to switch between the inputs to cause the feedback circuit of the power supply unit to compensate the voltage output for a voltage drop on the power path or the remote node.

20 Claims, 22 Drawing Sheets

(56) References Cited

U.S. PATENT DOCUMENTS

2016/0254752 A1* 9/2016 Wood, III ............... G06F 1/305
363/15

OTHER PUBLICATIONS

Extended European Search Report for EP Application No. 19168790.4, dated Nov. 19, 2019.

* cited by examiner

METHOD AND SYSTEM FOR CHASSIS VOLTAGE DROP COMPENSATION

TECHNICAL FIELD

The present disclosure relates generally to power systems for a multi-node chassis. More particularly, aspects of this disclosure relate to using a remote sensing feedback system to compensate for power losses in a multi-node system.

BACKGROUND

The emergence of the cloud for computing applications has increased the demand for off-site installations, known as data centers, that store data and run applications accessed by remotely connected computer device users. A typical data center has physical chassis structures with attendant power and communication connections. Each rack may hold multiple network devices such as servers and may constitute a multi-node server system.

A conventional multi-node chassis server system typically includes a chassis management controller, a plurality of computing nodes, a cluster of hard disks (termed the storage node), a cluster of all of the power supply units (PSU) on a power distribution board (PDB), and a midplane to connect all the functional boards. Each of the computing nodes can include a baseboard management controller (BMC), a platform controller hub (PCH), and one or more central processing units (CPU). A chassis management controller (CMC) can be provided to communicate with the BMC of each node by an Intelligent Platform Management Interface (IPMI) command. The CMC will get information relating to the multi-node system to control or monitor the power supply units on the PDB.

The power supply units supply electrical power to an entire multi-node chassis server system. The primary function of a power supply unit is converting electric power from an AC source to the correct DC voltage and DC current for powering components on the server system.

When the AC power is plugged into the PSU, the PSU will provide the standby power to the system. Additionally, the PSU typically performs a startup routine that first determines whether the AC input is functioning normally. The PSU will provide an "AC Vin Power Good" signal to the host if this is the case. Thereafter, when the PSU receives a "PS_ON" signal, the PSU will supply DC power to the system. In operation, the PSU will sense the voltage level of the DC power by local or remote sensing. If the voltage level of the DC power rises to 90% of system voltage range, the PSU will provide a "DC Power Good" signal to the host. Alternatively, the PSU will generate an alert signal to the host when the PSU is in a fault mode because the AC voltage wasn't connected, or DC power is not activated. Such conditions may result from over-voltages or under-voltages that cause over-voltage protection or under-voltage protection to be implemented to protect the PSU.

Sensing techniques are typically used by a PSU to output the correct DC voltage level to the server system. Currently, many conventional PSUs use a feedback sensing signal to make voltage output adjustments based on the difference between the intended voltage output and the actual voltage output. If the feedback control voltage mechanism is functioning properly, the actual voltage output will be very close to the intended voltage output and no adjustment is required. In one particular sensing technique, local sensing, the PSU simply measures the voltage at the output terminals where the power leads to the server system are connected. However, local sensing cannot account for voltage drops from electrical resistance of the electrical leads to remote nodes of the server system. Therefore, the local sensing technique only calibrates or compensates the output voltage level at the output terminals of the PSU. However, there may be a lower voltage level at the input terminals of the nodes in the system due to resistances between the PSU and the nodes.

In many server designs, PSUs often face the challenge of delivering power across large scale printed circuit boards (PCB). To compensate for resistive power drops on a circuit path, another sensing technique, remote sensing, is often used by a PSU to determine voltage drops. In this technique, a PSU will compensate for system voltage drop by using a feedback signal adjustment. However, the feedback signal in most current server designs typically cannot be connected or routed from one node to another. Therefore, the remote sensing by the PSU is often performed by sensing a local or nearest sensing point, and providing a feedback signal from the sensing point to the PSU. Consequently, feedback signals are difficult to connect to more than two nodes, and voltage drops may occur without a PSU sensing the drop. This results in potential interruption of server operation because the PSU is not controlled via feedback to supply sufficient power to compensate for the drop in voltage to remote nodes.

Remote sensing, as shown in a voltage compensation system 10 in FIG. 1, may be used to calibrate a voltage drop by increasing the output voltage level of the PSU. The system 10 includes a PSU 12, a node 14, and a power path 16 connecting the PSU 12 to the node 14. A resistor ($R_{path}$) represents the summation of electrical resistance of the power path 16. The power path 16 may include mechanical components, electrical components, and printed circuit boards. The PSU 12 will compensate its output voltage level based on adjustment of the voltage drop feedback signal.

The PSU 12 includes a voltage regulator 20, and an operational amplifier 22. The operational amplifier 22 has inputs coupled to a voltage input 24 and a voltage output 26 of a load 28 of the node 14. Thus, the output of the operational amplifier 22 is the difference between the input voltage and the output voltage to the node 14, and constitutes the voltage drop feedback signal.

Table 1 shows an example PSU output voltage range.

TABLE 1

| Parameter Description | Min | Typ | Max | Units |
|---|---|---|---|---|
| +12 VDC | 11.40 | 12.00 | 12.60 | Volts |
| 12 V Standby | 11.40 | 12.00 | 12.60 | Volts |

Power supply over voltage protection may be locally sensed. The power supply may be shut down in a latch off mode upon an over voltage condition on the DC output of the power supply. This latch is cleared by a sled toggling the PSON signal or by an AC input re-cycle/re-plug.

Table 2 shows the minimum and maximum output voltage levels for the over-voltage protection (OVP) condition. The PSU output voltage levels are measured at the pins of PSU card edge receptacle with minimum and maximum output loads.

TABLE 2

| AC input | Output Level | Over voltage Min | Overvoltage Max |
|---|---|---|---|
| 90 V, 264 V | +12 VSB | 13.2 V | 15.0 V |
| 47 Hz, 63 Hz | +12 VDC | 13.2 V | 15.0 V |

In server systems, designers often face the challenges of delivering power across large-scale printed circuit boards. In order to provide precious board real estate to critical components, such as ASICs and CPUs, the PSUs are often allocated to the corner or edge of the board or chassis. This placement requires longer leads to provide power to the printed circuit boards and the components mounted on such boards. To compensate for resistive drops from the power path to the components, a remote sensing system, such as that shown in FIG. 1, is often used, especially for low-voltage, high-current applications.

FIG. 2 is an internal resistance diagram 30 that is a voltage drop analysis on an example server design. Thus, the diagram 30 may be used to determine maximum voltage drop compensation value to insure the system may be operational when the PSUs operate in the lower voltage range. The diagram 30 includes boxes 32, representing PSUs, that show corresponding voltage outputs. The diagram 30 also includes a series of boxes representing voltage drops from the components of the multi-node server design, such as a power distribution board box 34, a midplane box 36, a series of node boxes 38a-38d (representing node 0 to node 3), a hard disk drive backplane (HDDBP) box 40, and a fans board box 42. A box 44 represents a voltage drop from connectors or cables between the PSUs and the power distribution board. A box 46 represents a voltage drop from connectors or cables between the power distribution board and the midplane. A box 48 represents a drop in voltage from connectors or cables between the midplane 36 and the nodes, the HDD backplane, and the fans board. As shown in the diagram 30, each of the components results in certain voltage drops due to internal resistance.

In the example diagram 30, the maximum voltage drop compensation value is 750 mV. The PSUs will each output a fixed voltage of 12.75V in this example. In a traditional server design, the CMC or BMC will program the output of the PSU at a fixed voltage level, such as 12.75 V, to match and compensate for the internal resistance drop requirement. If the PSUs in the server system do not support such a program function, the node 3 terminal voltage (from the node box 38d) will be the lower voltage level, for example 12V−0.75V=11.25V. Therefore, on node 3, the system voltage is on the lower voltage level and, to some degree, can lead to devices in the node, such as Open Compute Project (OCP) cards and/or Peripheral Component Interconnect express (PCIe) cards, to be unstable or not function at all.

The OCP card power rail requirement is defined by Table 3.

TABLE 3

| Power Rail | ≤80 W Slot | 150 W Slot |
|---|---|---|
| +3.3 V_EDGE | | |
| Voltage Tolerance Supply Current | +/−9% (max) | +/−9% (max) |
| ID mode | 375 mA (max) | 375 mA (max) |
| Aux mode | 1.1 A (max) | 2.2 A (max) |

TABLE 3-continued

| Power Rail | ≤80 W Slot | 150 W Slot |
|---|---|---|
| Main mode | 1.1 A (max) | 2.2 A (max) |
| Capacitive Load | 150 uF (max) | 300 uF (max) |
| +12 V_EDGE | | |
| Voltage Tolerance Supply Current | +/−8% (max) | +/−8% (max) |
| ID mode | 100 mA (max) | 100 mA (max) |
| Aux mode | 3.3 A (max) | 6.3 A (max) |
| Main mode | 6.6 A (max) | 12.5 A (max) |
| Capacitive Load | 1000 uF (max) | 2000 uF (max) |

As may be seen in Table 3, the worst case for a 150 W OCP card voltage tolerance is +/−8% (e.g., 11.04V-12.96V). Table 4 shows the power rail supply requirements according to the PCI-e Gen4 standard.

TABLE 4

| Power Rail | 75 W Slot | 2 × 3 connector | 2 × 4 connector |
|---|---|---|---|
| +12 V | | | |
| Voltage Tolerance | +/−8% | +5%/−8% | +5%/−8% |
| Supply Current | 5.5 A | 6.5 A | 12.5 A |

When a PCI-e Gen4 card supports a 150 W power rail, a +12V voltage tolerance was defined to +5%/−8% (e.g., maximum of 12.6V and minimum of 11.04V).

FIG. 3A and FIG. 3B show block diagrams of a traditional 2U-4N chassis 50. The chassis 50 includes a series of PSUs 52, a power distribution board (PDB) 54, a midplane 56, a series of computing nodes 58a-58d, and a HDD backplane 60. Each of the PSUs 52 includes power outputs 62 and sideband signal outputs 64. Each of the PSUs 52 is connected to the PDB 54 via a ground fault connector 66. The PDB 54 includes a chassis management controller (CMC) 68. The power from the PSUs 52 is routed between the PDB 54 to the midplane 56 via a series of power connectors 70. A side band connector 72 allows control and sensing signals to be routed through the PDB 54. The nodes 58a-58d, and HDD backplane 60 receive power via board to board connectors 74. Each of the nodes 58a-58d includes a BMC 76, a platform control hub (PCH) 78, and one or more CPUs 80.

The PSU remote sensing is taken from a sensing point 82 or a nearby connector at the midplane 56 as shown in FIG. 3A. The PSU remote sensing may also be taken from a sensing point 84 or nearby connector at the PDB 54, as shown in FIG. 3B. A voltage level sensing signal is fed to the RS+/RS− inputs of the PSUs. Remote sensing is widely used in server applications to meet the server system voltage level accuracy requirements. To compensate for resistive drop of the power path, remote sensing is often used on server system designs to adjust power levels output by the PSUs. The differential amplifier 22 in FIG. 1 in the PSU 12 may also be used as a voltage buffer, provided the electrical specifications, such as the PSU output voltage range, are not exceeded. The remote sensing taken does not allow compensation or calibration for line drop effects between the sensing points 82 and 84 and the computing nodes 58a-58d or the backplane 60. Further, routing long traces will couple noise to analog signals and this noise will feedback to the PSUs.

Multi-node systems such as a server chassis 50 shown in FIGS. 3A-3B employ the chassis management controller (CMC) 68 to manage power and other operational functions.

The CMC is a hot-plugging system management software and hardware solution for a multi-node chassis server. In past designs, the CMC may be a microprocessor (MCU) with memory to provide remote management capabilities and power control functions. The CMC can release alert signals for warnings or errors related to temperature, hardware misconfiguration, AC/DC power unavailability, and fan speed control.

Most remote sensing circuits are capable of compensating for 0.25V to 0.75V of voltage-drops across the power path. However, the maximum remote sensing compensation range in the PSU datasheet determines the maximum range of a PSU. The remote sensing automatically increases the output voltage level at the output terminals of the PSU to compensate for any unwanted voltage drop in the system power path with a full loaded system current. Likewise, the remote sensing system decreases the output voltage level of the power supply when the required system current is reduced. In some applications, the power supply output needs to be adjusted by the user to voltages higher than its nominal value (e.g. 12V nominal, adjusted to 12.75V). The power supply output level is always adjusted while measuring the voltage level at the midplane or PDB of a server system. In addition, it is desirable to insure that the remote sense function does not push the system voltage level to a higher voltage that could possibly trip the over-voltage protection (OVP) setpoint and shut down the power supply under full load. Therefore, server designers will always check the instruction manual of a power supply unit to be aware of the adjustment range and the over voltage protection set point of the unit.

FIG. 4 shows an equivalent circuit diagram for a typical voltage protection circuit 100 for a multi-node server system such as the server system 50 shown in FIGS. 3A-3B. The circuit shown in FIG. 4 is a traditional "4-wire" remote sensing V-drop compensation equivalent circuit for a multi-node chassis server system. The circuit 100 includes PSUs 102, a power path 104, a PDB or midplane 106, and a power path 108. The circuit 100 includes nodes 110, 112, 114, and 116 and respective loads for each the node. The circuit 100 also includes a HDD back-plane 120, and a fans board 122, with respective loads. The power path 104 includes a resistor (Rpath_PDB), that represents the resistance of the PDB or the midplane. The power path 108 includes a resistor (Rpath_node), that represents the resistance of the nodes 110, 112, 114, and 116, the HDD back-plane 120, and the fans board 122. Thus, the resistor Rpath_Node represents wires and mechanical components of the hot-plugging nodes 110, 112, 114, and 116, the HDD backplane 120, and the fans board 122.

The remote sensing circuit 100 will feedback to a differential operational amplifier 130 to compensate output voltage level by controlling a voltage supply 132. The operational amplifier 130 detects the voltage drop (Rpath_PDB× Iload) from the output of the PSUs 102 to the PDB or mid-plane board 106. The traditional voltage drop compensation mechanism only compensates for the PDB or midplane side based on the difference between the input and output voltages at a sensing point 134. Such traditional compensation circuits cannot compensate for voltage drops (Rpath_Node×Iload) from the node or nodes or the HDD backplane because the remote voltage drops cannot be sensed. Thus, the system power rail cannot provide the desired voltage range to the node, the HDD backplane and or the fan board. The hot-plugging nodes, HDD backplane, fans board and remote load voltage will be less than the source voltage level of the PDB or the midplane. Unfortunately, power path transmission line resistance and node load variations introduce voltage drop uncertainties, limiting achievable performance, and the chassis system may become unstable.

Thus, there is a need for feedback voltage drop reporting across all nodes of a multi-node system at a particular node for adjusting power. There is also a need for remote reporting of node operational data without having to rely on localized feedback signals. There is also a need to provide power signal compensation to eliminate inrush currents when hot plugging nodes are added to a multi-node system.

SUMMARY

One disclosed example is a voltage compensation system for voltage drops in a device having a remote node. The voltage compensation system includes a power supply unit having an adjustable voltage output and a feedback circuit. The voltage output is adjusted based on the output of the feedback circuit. A power path is coupled to the power supply unit. The power path is operable to supply voltage from the power supply unit to the remote node. A switch has an output coupled to the feedback circuit. The switch switching the output between a first input coupled to the power path, and a second input coupled to the remote node. A controller is coupled to the switch. The controller is operable to control the switch to switch between the inputs to cause the feedback circuit of the power supply unit to compensate the voltage output for a voltage drop on the power path or the remote node.

Another disclosed example is a method of compensating remote voltage drops for a system. The system has a power supply unit; a power path coupled to the power supply unit; a remote node powered by the power supply unit through the power path; and a switch having an output coupled to the feedback circuit. The switch as a first input coupled to the power path and a second input coupled to the remote node. The switch is switched to the second input via a controller to determine the voltage drop from the remote node. A feedback signal is output based on the voltage drop from the remote node to the power supply unit. The voltage level of the power supply unit is adjusted based on the feedback signal to compensate for the voltage drop.

Another disclosed example is a multi-node system including a power distribution board. A power supply unit is mounted on the power distribution board. The power supply unit includes a feedback circuit and an adjustable voltage output. A plurality of nodes includes a computing node and a storage backplane node. Each of the plurality of nodes is coupled to the adjustable voltage output of the power supply unit. A controller is mounted on the power distribution board. The controller receives voltage drop data from each of the plurality of nodes. A switch has an output representing a voltage drop coupled to the feedback circuit. The output switches between a first input coupled to the power distribution board, and a second input coupled to the controller to receive voltage drop data from at least one of the plurality of nodes. The power supply unit adjusts the voltage output to compensate for voltage drops received by the feedback circuit.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
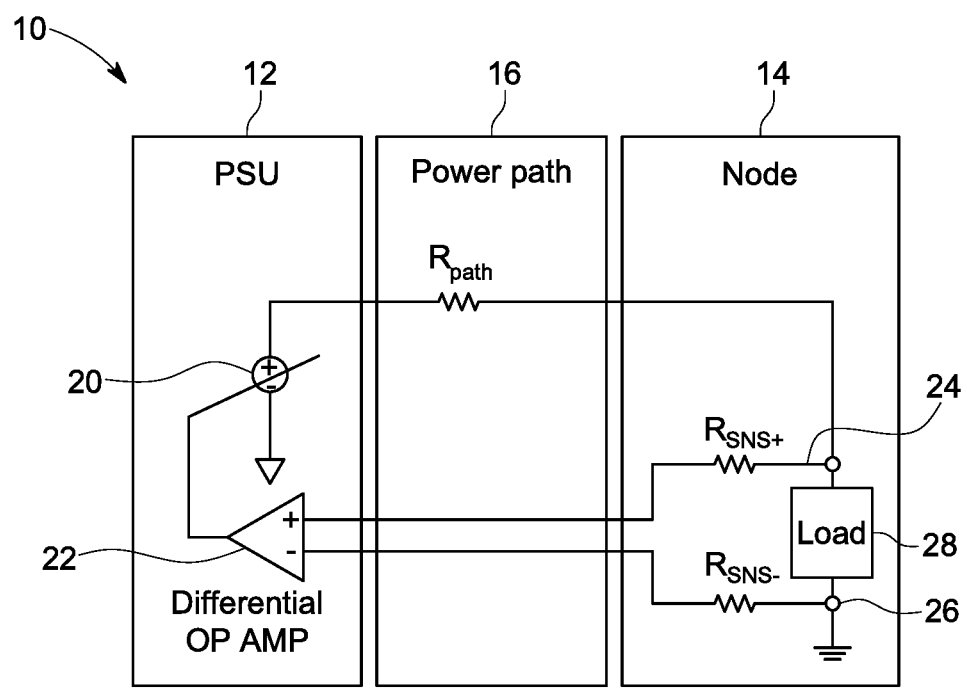
FIG. 1 is a prior art sensing circuit to detect local voltage drops.
Figure 2:
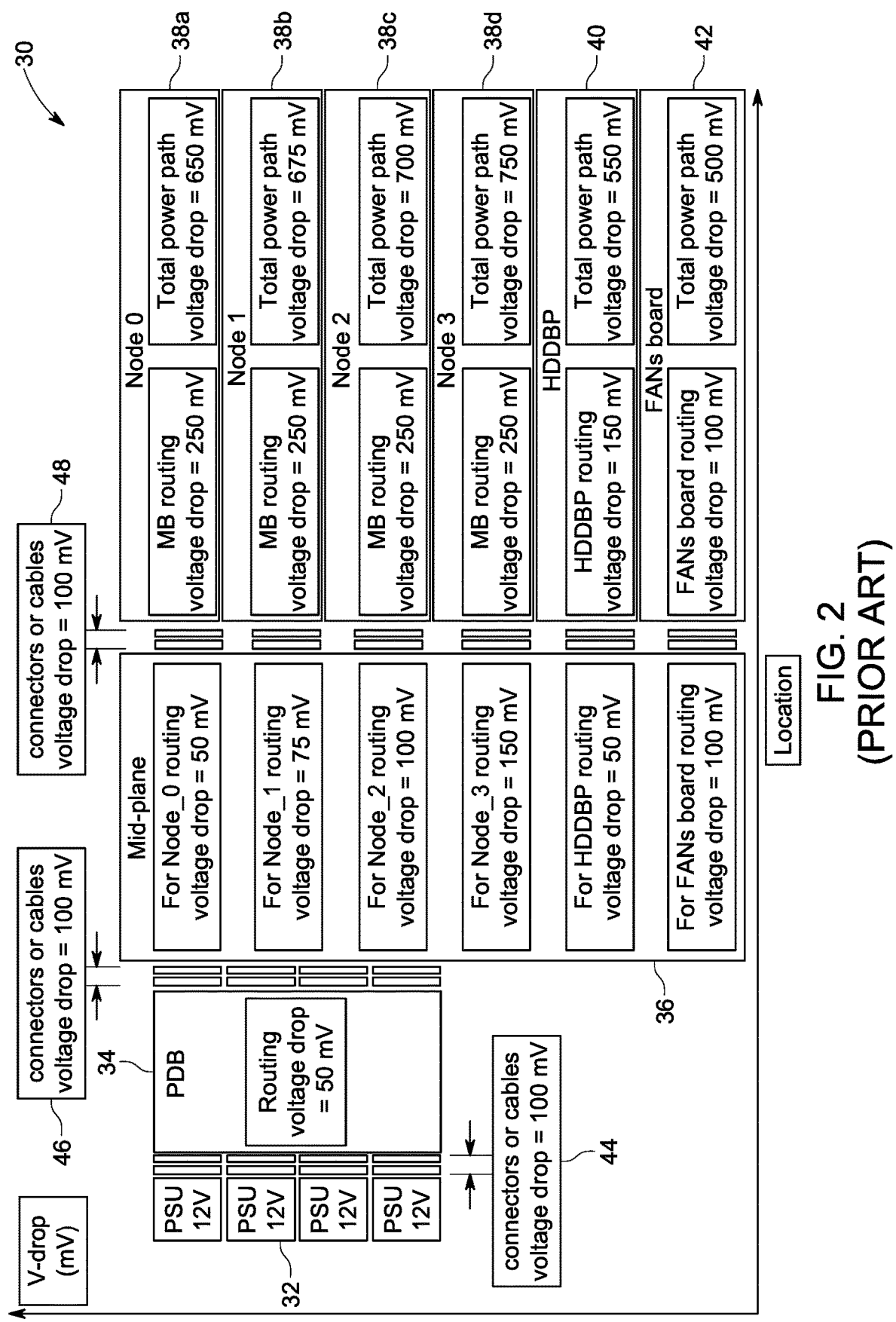
FIG. 2 is a block diagram of internal resistance voltage drops throughout a prior art server system.
Figure 3A:
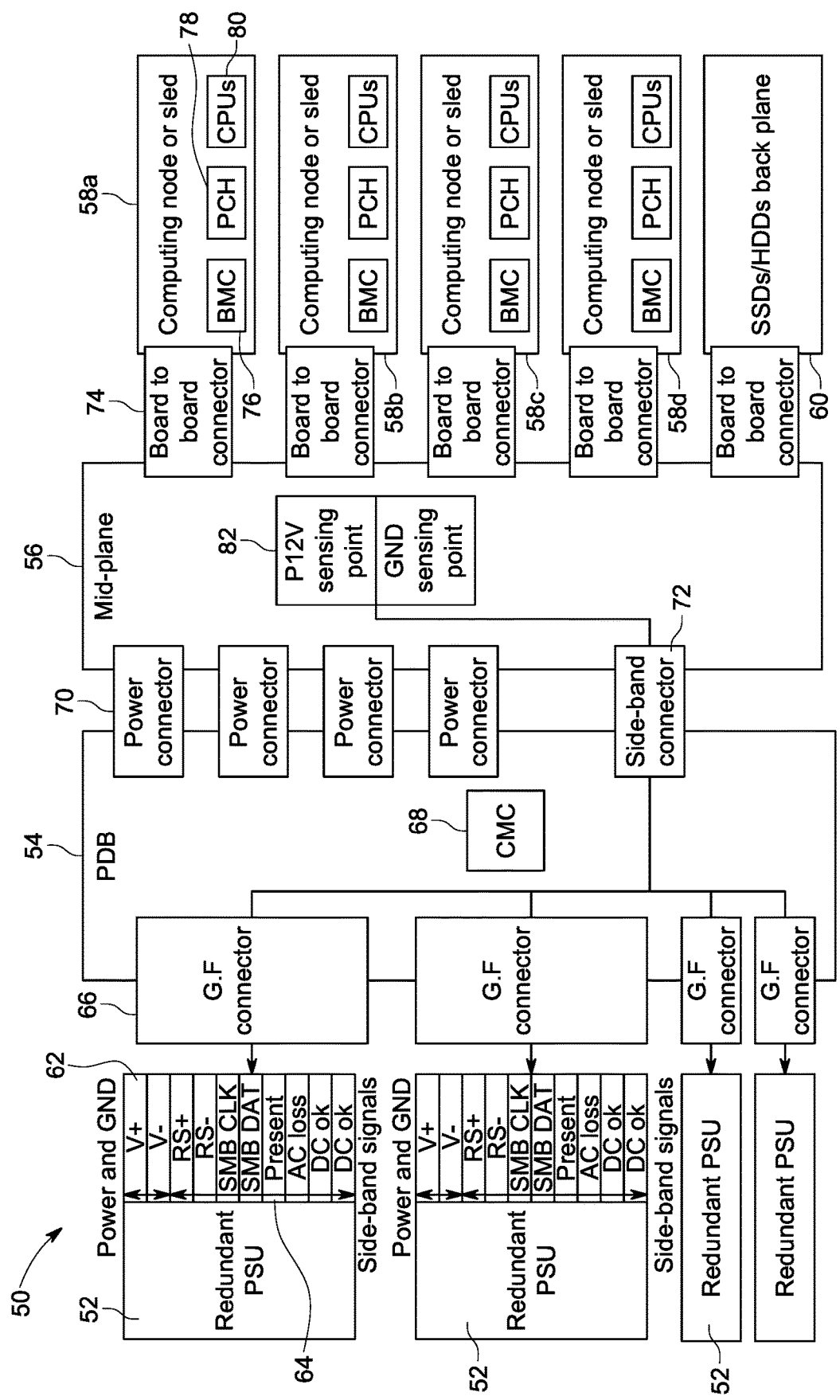
FIGS. 3A-3B are block diagrams of a prior art server system showing different local sensing points that do not allow remote sensing of voltage inputs to nodes in the server system.
Figure 3B:
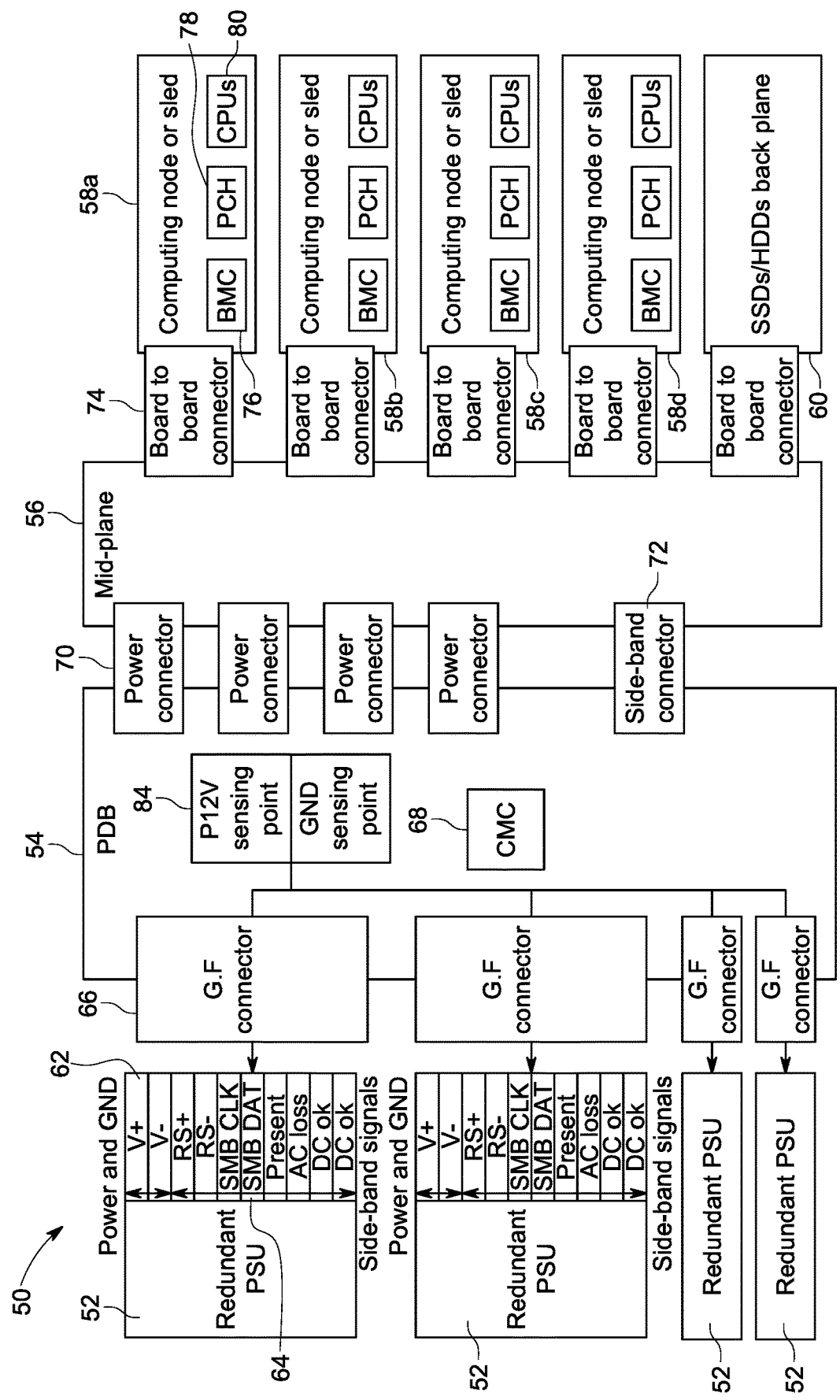
Figure 4:
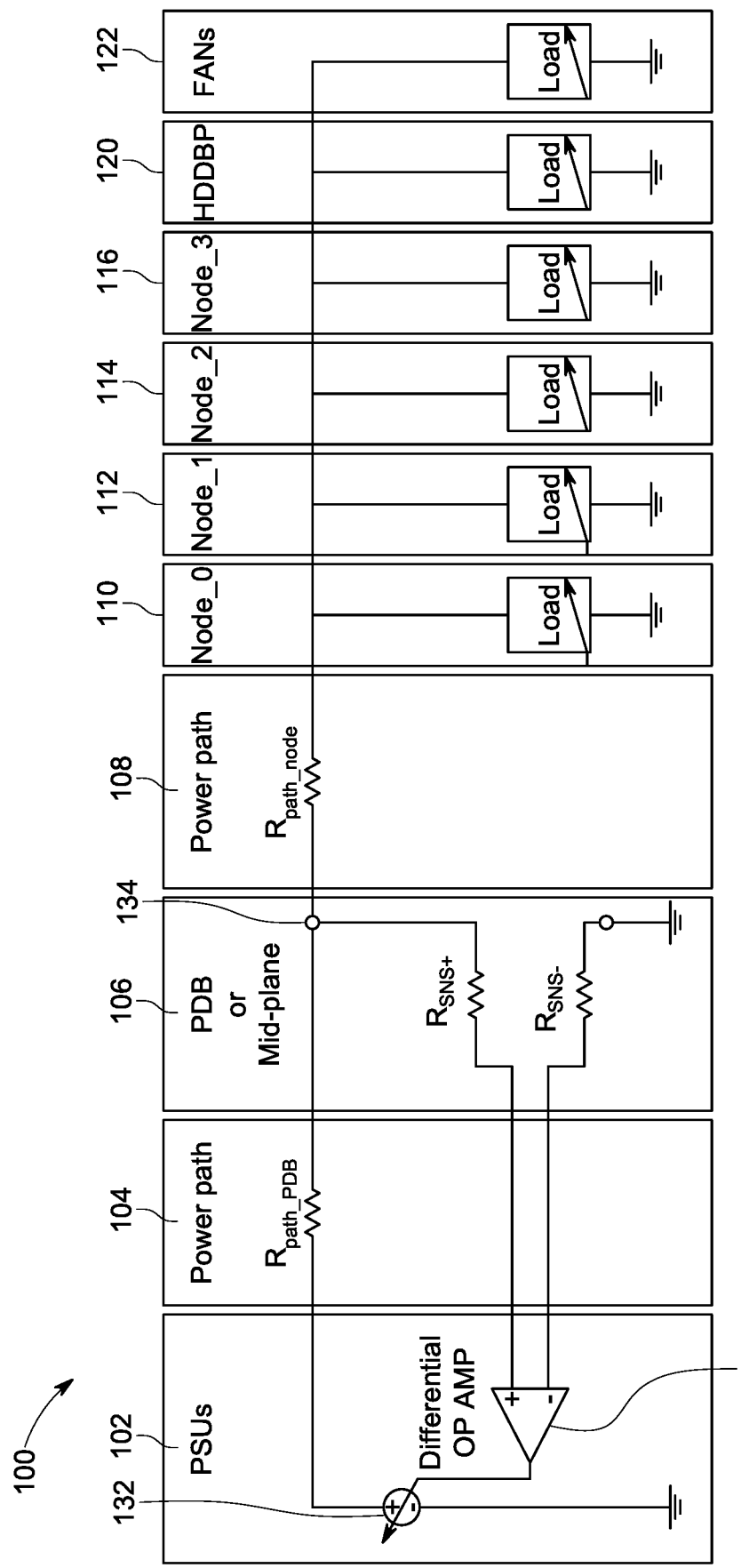
FIG. 4 is an equivalent circuit diagram of a prior art sensing circuit that allows for remote sensing of voltage in a multi-node server system.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The disclosed system provides a mechanism to effectively compensate system voltage drops in a multi-node chassis server system. The disclosed method and system allows all nodes in a multi-node system to report node operating information, including voltages, to a chassis management controller (CMC). The operating information may be sent by baseboard management controllers (BMCs) on each node using IPMI commands. The CMC will be aware of the status of each node based on the received operating information. A feedback control for a remote sensing signal to a power supply unit (PSU) compensates for voltage drops of a multi-node chassis server system in real-time. Therefore, this mechanism can avoid noise coupling to remote sensing signals of long traces and more robustly compensate for system voltage drop from power-path transmission line resistance, and multi-node load variations.

Figure 5:
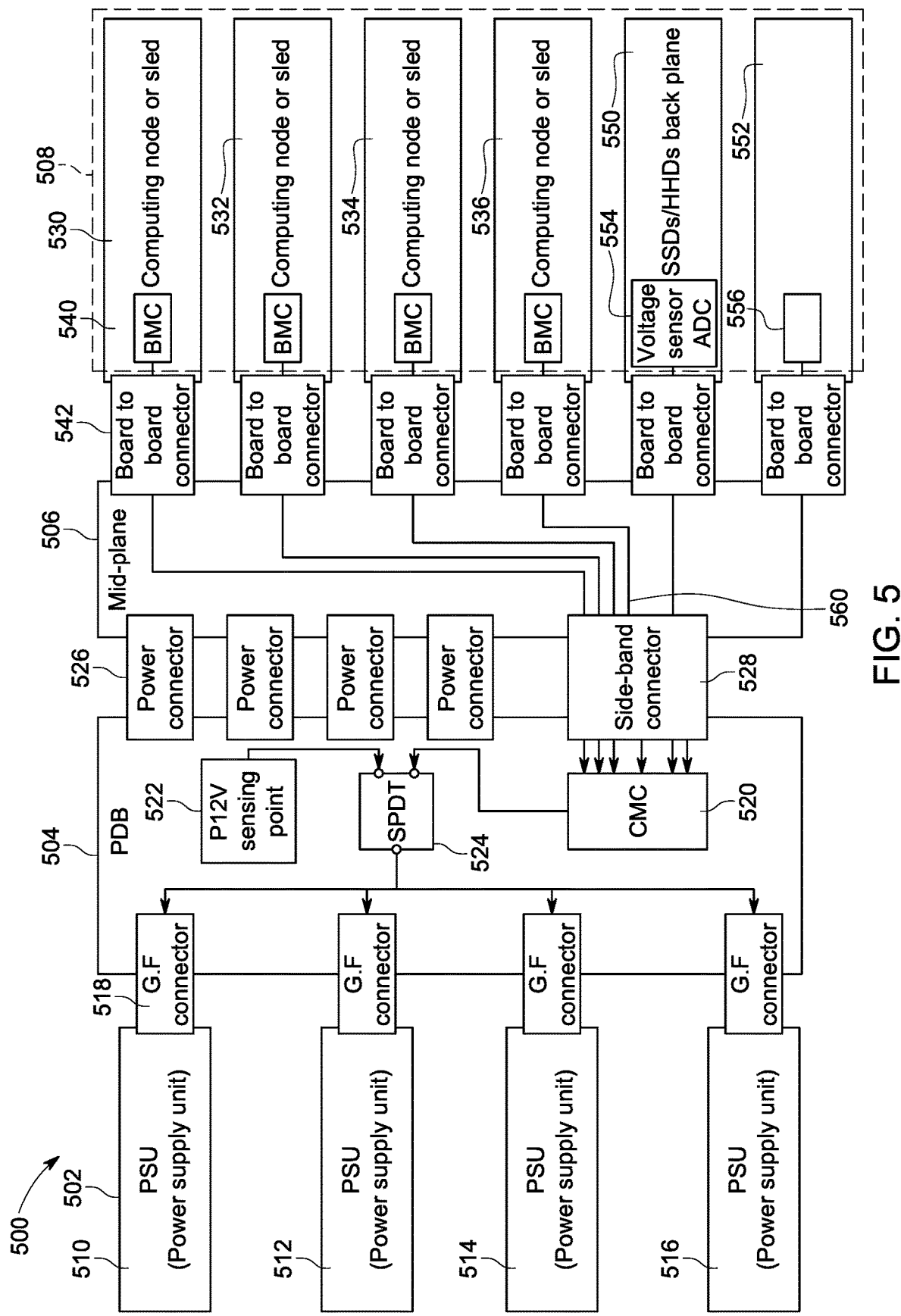
FIG. 5 is a block diagram of an example multi-node system that allows distributed feedback for detection of voltage drops.

FIG. 5 is a block diagram of an example 2U-4N chassis server system 500 that includes a remote feedback system for compensating for voltage drops on individual remote nodes as well as local feedback for voltage drops on a power path. The system 500 includes a PSU module 502, a power distribution board 504, a midplane 506, and a device module 508. In this example, the PSU module 502 includes four PSUs 510, 512, 514, and 516. Each of the PSUs 510, 512, 514, and 516 convert AC power to DC power, and provide DC output voltages to the power distribution board 504 via GF connectors 518.

The power distribution board 504 includes a CMC 520, a power sensing point 522, and a single-pole double-throw analog switch (SPDT) 524. Power connectors 526 connect the power distribution board 504 to the midplane 506. A side board connector 528 provides input signals to the CMC 520.

The device module 508 includes computing nodes 530, 532, 534, and 536. The computing nodes 530, 532, 534, and 536 may be servers or other computing devices that are mounted in removable sleds. The removable sleds and their corresponding computing nodes may be hot plugged into the chassis system 500. The computing nodes 530, 532, 534, and 536 all include a baseboard management controller (BMC) 540. The computing nodes 530, 532, 534, and 536 all draw power from board to board connectors 542. The device module 508 may also include a storage device backplane, such as a HDD backplane 550, that mounts storage devices such as hard disk drives. Other storage devices such as solid state drives (SSD) may be used instead. The device module 508 also includes cooling devices such as fans mounted on a fans board 552. The HDD backplane 550 includes a voltage sensor 554. The fans board 552 includes a voltage sensor 556.

As explained above, all of the devices are powered by the PSUs 510, 512, 514, and 516 in the PSU module 502. A bus 560, which can be an Intelligent Platform Management Bus (IPMB), allows the BMCs 540 to communicate with the CMC 520 on the power distribution board 504.

Thus, the CMC 520 will communicate with a hot-plugged node, such as the node 530, by an Intelligent Platform Management Interface (IPMI) command on the IPMB 560. The CMC 520 will provide a BMC node number to the node when the sled is inserted into the chassis system 500. Each of the BMCs 540 monitor the main-board status include voltage, current, temperature and more for their respective nodes. Each of the BMCs 540 provides the main board information of the node to the CMC 520 through the bus 560 connected via the side-band connector 526. The CMC 520 also monitors the voltage of the HDD backplane 550 by receiving input signals from the voltage sensor 554, and the fans on the fan board 552 via the voltage sensor 556 on the fans board 552. The CMC 520 also monitors the PSUs 510, 512, 514, and 516, and other operational data from the server system 500 via a power management bus.

Figure 6A:
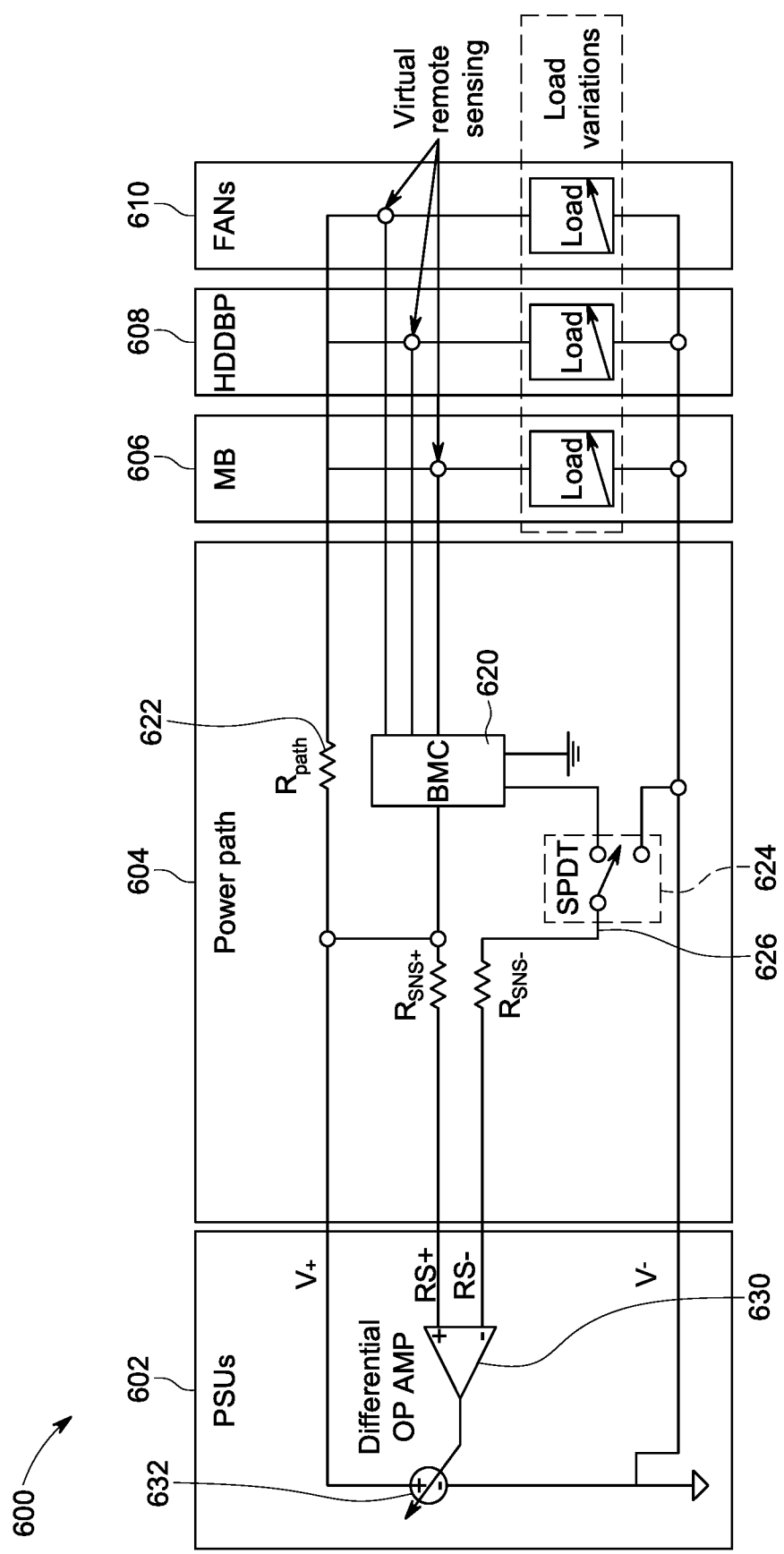
FIG. 6A is an equivalent circuit diagram of an example remote sensing system for a single server system.

FIG. 6A is an example of a voltage-drop compensation equivalent circuit 600 for remote sensing of components in a single node chassis server system. The BMCs in such a system can use digital signals of sensed voltages and convert, filter, and average analog signals to compensate voltage drop. The equivalent circuit 600 includes a PSU equivalent circuit 602, a power path equivalent circuit 604, a load 606 representing the main board, a load 608 representing the HDD backplane, and a load 610 representing the fans board. The power path equivalent circuit 604 includes a BMC 620 that is connected to the loads 606, 608, and 610 for remote sensing. A resistor 622 represents the resistance of the power path equivalent circuit 604. As will be explained below, the output of a single-pole double-throw analog switch (SPDT) 624 is connected to one of the inputs of an operational amplifier 630. The other input of the operational amplifier 630 is connected to the output voltage rail of the PSU. The output of the switch 624 may be switched between the remote load voltages or the local voltage of the power path 604. The output of the operational amplifier 630 serves as the feedback signal to allow adjustment of a power source 632 based on either the local resistance or the resistance from the remote load.

Figure 6B:
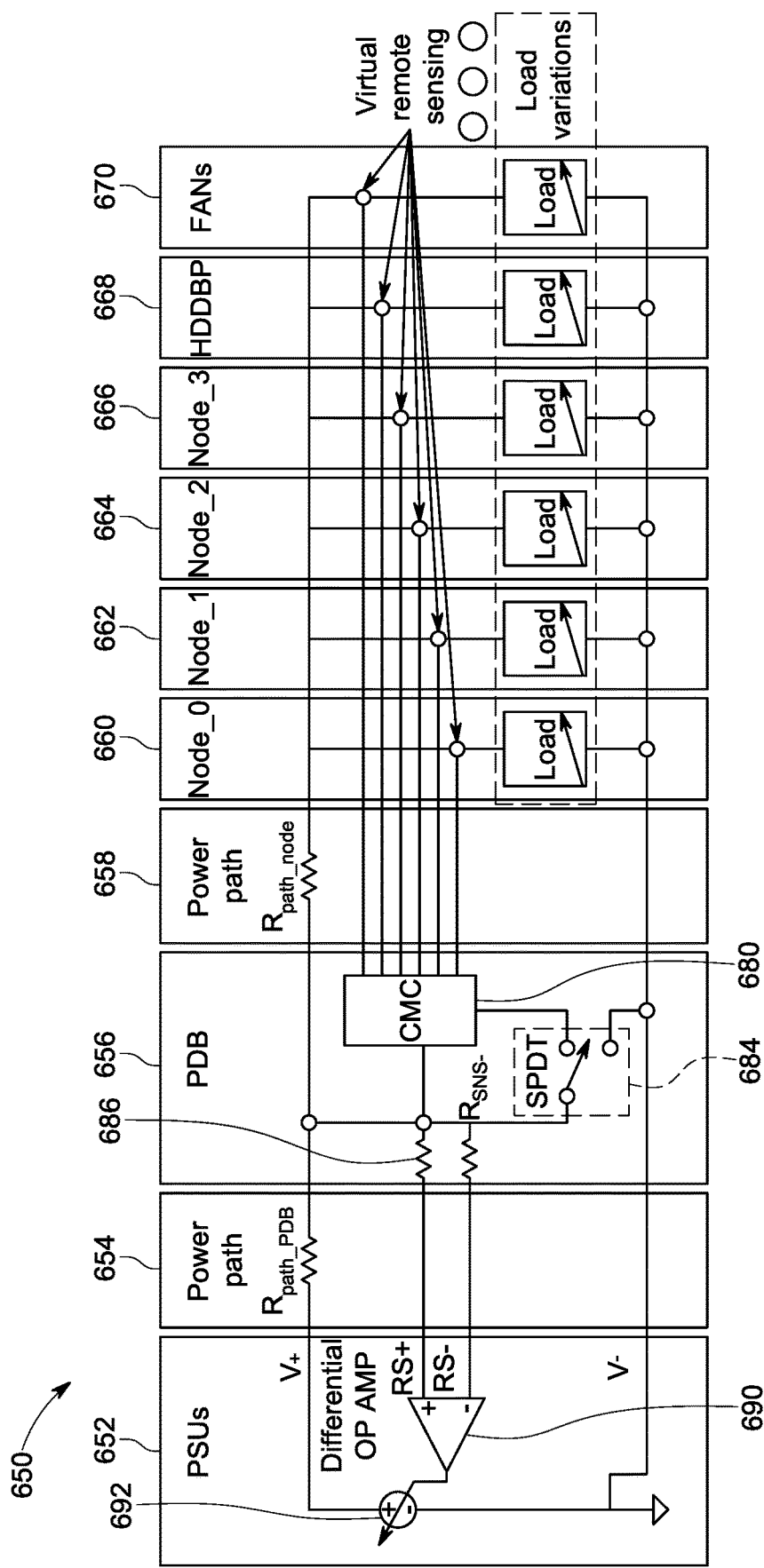
FIG. 6B is an equivalent circuit diagram of an example remote sensing system for a multi-node server system.

FIG. 6B is an example of a voltage-drop compensation equivalent circuit 650 for remote sensing of components in a multi-node chassis server system such as the system 500 of FIG. 5. The equivalent circuit 650 includes a PSU equivalent circuit 652, a PDB power path equivalent circuit 654, a power distribution board equivalent circuit 656, and a node power path equivalent circuit 658. The equivalent circuit includes loads 660, 662, 664, and 666 representing server nodes, a load 668 representing the HDD backplane, and a load 670 representing the fan board. Resistors represent the resistance of the power path equivalent circuits 654 and 658. The power distribution board equivalent circuit 656 includes a CMC 680 that is connected to the loads 660, 662, 664, 666, 668, and 670, for remote sensing. The output of a single-pole double-throw analog switch 684 is connected to one of the inputs of an operational amplifier 690. The other input of the operational amplifier 690 is connected to the output voltage rail of the PSU. The output of the switch 684 may be switched between the remote load voltages or the local voltage of the power distribution board 656. The output of the operational amplifier 690 serves as the feedback signal to allow adjustment of a power source 692 based on either the local resistance or the resistance from the remote load.

As may be seen in the equivalent circuits 600 and 650, power is provided from the PSUs to the loads and equivalent circuits representing power consuming components such as the main board, nodes, HDD backplane and fans board. As explained above, a single node or multi-node system suffers from power-path resistance and load variations that may introduce system voltage uncertainties. The equivalent circuits 600 and 650 incorporate a single-pole double-throw analog switch to switch between local sensing of voltage drops and remote sensing of voltage drops to allow more accurate voltage adjustment of power output from the PSUs.

Figure 7A:
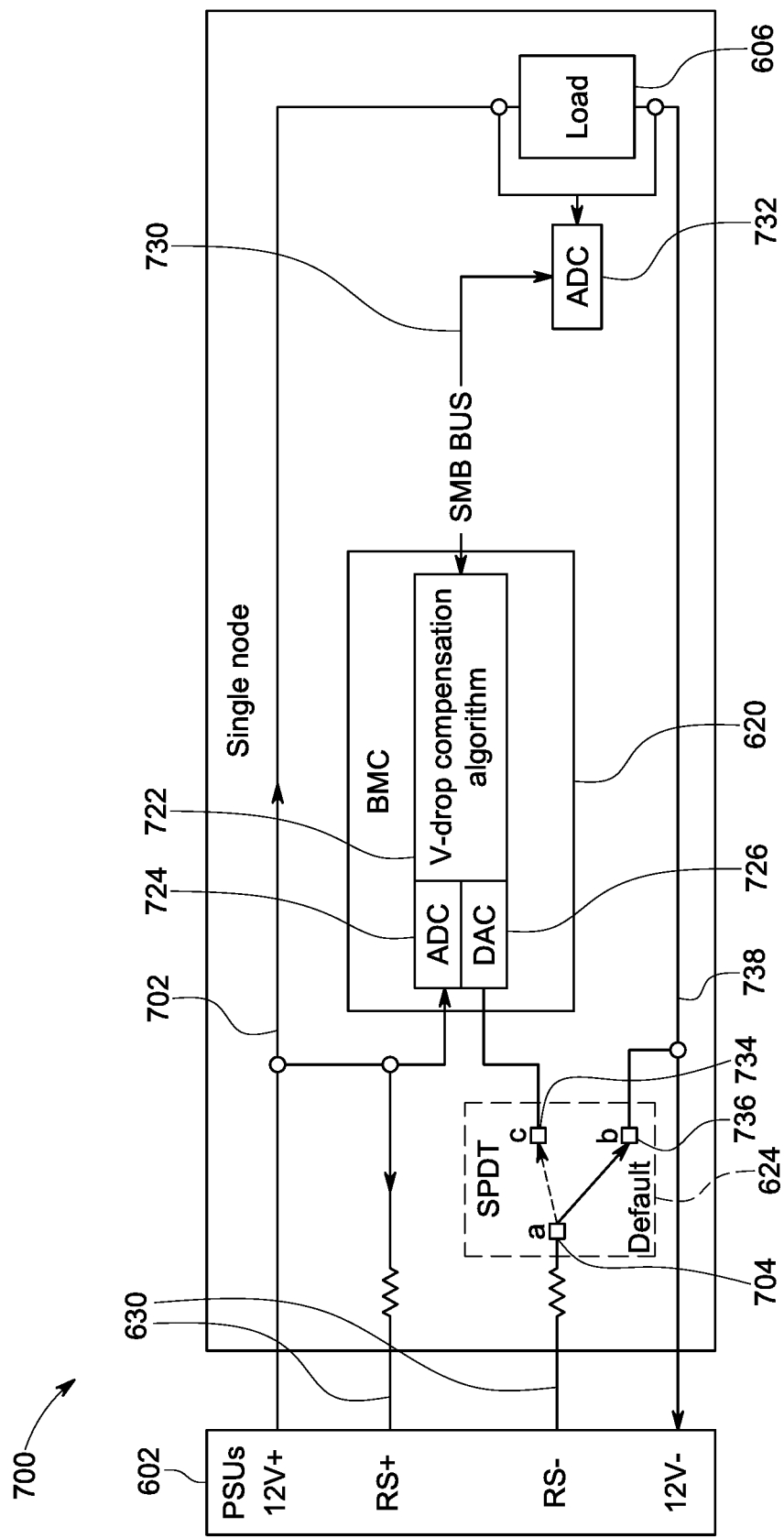
FIG. 7A is a circuit diagram of the remote sensing points in the circuit shown in FIG. 6A.
Figure 7B:
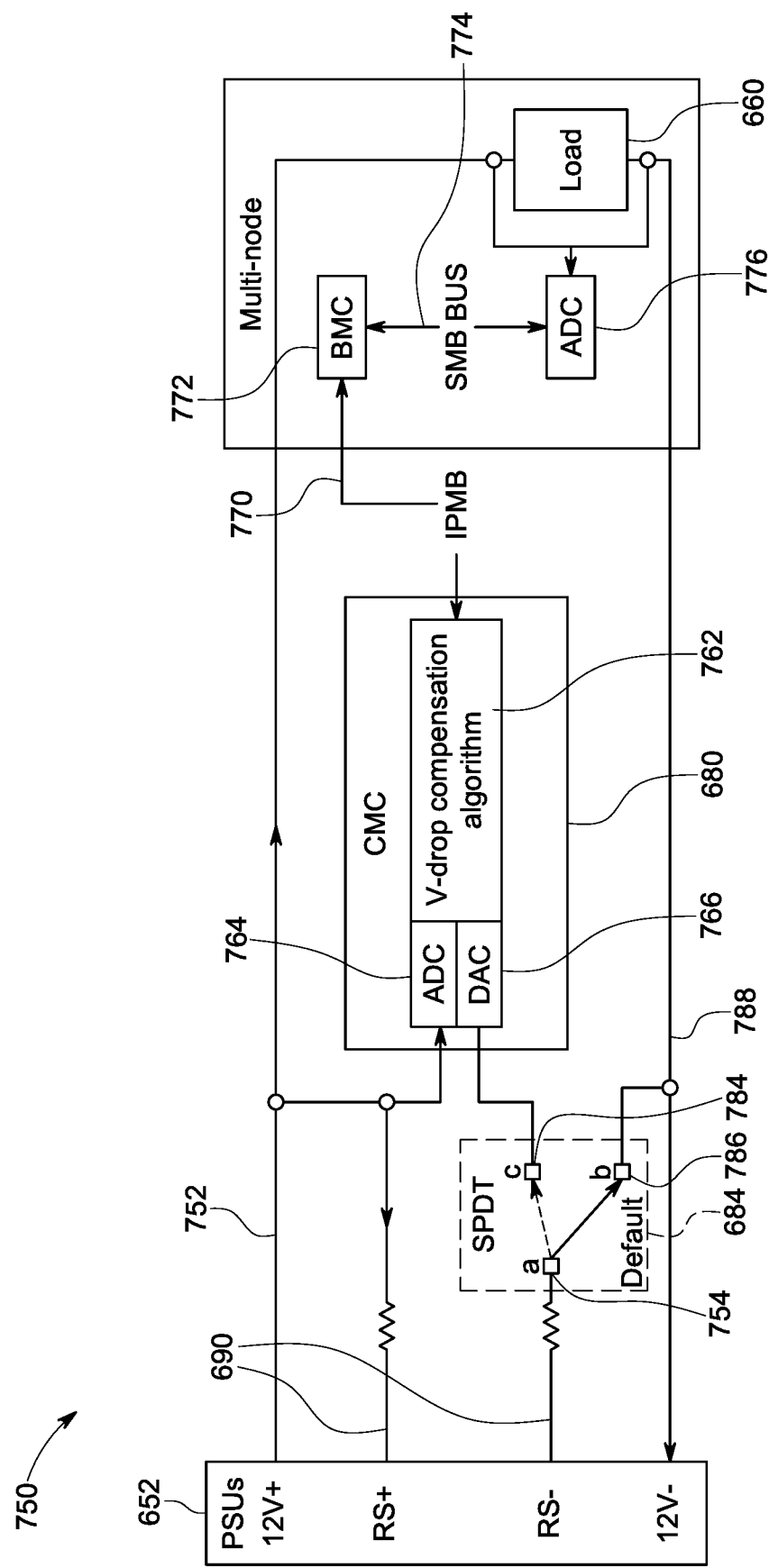
FIG. 7B is a circuit diagram of the remote sensing points in the circuit shown in FIG. 6B.

FIG. 7A is a detailed circuit diagram of a sensing system 700 for the voltage-drop compensation equivalent circuit 600 in FIG. 6A for a single node chassis server system. FIG. 7B is a detailed circuit diagram of a sensing system 750 for the voltage-drop compensation equivalent circuit 650 in FIG. 6B for a multi-node chassis server system. Like elements in FIGS. 7A-7B are labeled with like numbers as their counterparts in FIGS. 6A-6B.

As may be seen in FIG. 7A, the inputs to the operational amplifier 630 are connected to the output of a high power rail 702 and an output 704 of the switch 624. The BMC 620 includes a voltage drop compensation algorithm 722, an analog to digital converter 724 and a digital to analog converter 726. The BMC 620 is connected to a system management bus 730 that is connected to the output of an analog to digital converter 732. The input of the analog to digital converter 732 is connected to the voltage drop of a load 606 representing a node such as the main board in FIG. 6A. The BMC 620 thus senses the voltage for each of the loads and determines the greatest voltage load. Based on the value of the voltage drop from the greatest load, the BMC 620 determines the offset value. In this example, the BMC 620 may run an artificial intelligence system such as a multi-layer perceptron (MLP) neural net, a recurrent neural network (RNN) or an artificial neural network (ANN) to output a result of an offset value or constant to adjust the compensation value. The switch 624 has an input 734 that is coupled to the output of the digital to analog converter 726 and an input 736 that is coupled to a low power rail 738.

The voltage drop compensation algorithm 722 implements an intelligent virtual remote sensing process to compensate for voltage drops caused by the resistance of power-path transmission lines and component load variations in a single node system. When a hot-plugging node is not connected, the switch 624 will switch or keep the input 736 connected to the output 704. Thus, the feedback output of the operational amplifier 630 will allow compensation of the voltage drop from the output terminals of the PSUs to the power path 604 in FIG. 6A. At the default location, the BMC 620 also can use the ADC 724 to read a voltage signal from the positive power rail 702 to calibrate itself for more accurate detection and compensation. When any load such as the main board 606 or HDD backplane 608 in FIG. 6A is inserted and powered up to start consuming power, the BMC 620 will control the switch 624 to switch the output 704 from being connected to the input 736 to be connected to the input 734 for intelligent virtual remote sensing. The voltage drop of the load 606 is thus input via the SMB bus 730 to the BMC 620. The BMC 620 outputs the voltage drop value through the digital to analog converter 726 to the input 734 of the switch 624. The BMC 620 can use the output of the DAC 726 to achieve voltage drop compensation by remote sensing. The output of the DAC 726 represents the voltage drop at the main board 606 and through the output of the switch 624, the PSUs 602 may now sense the voltage drop of the remote nodes such as the main board 606.

The equivalent circuit 650 for a multi-node system operates in a similar fashion. As may be seen in FIG. 7B, the inputs to the operational amplifier 690 are connected to the output of a high power rail 752 and an output 754 of the switch 684. The CMC 680 includes a voltage drop compensation algorithm 762, an analog to digital converter (ADC) 764, and a digital to analog converter (DAC) 766. The CMC 680 is connected to an IPMB bus 770 that is connected to a BMC 772 on board the node of interest. For ease of illustration, FIG. 7B only shows the IPMB bus 770 connected to one BMC. However, it is to be understood that the IPMB bus 770 is connected to the BMCs of all of the nodes of the multi-node system. The BMC 772 is connected via a system management bus 774 to an analog to digital converter 776 that is connected to the load representing a node such as the server 660 in FIG. 6B. The CMC 680 thus senses the voltage for each load and determines the greatest voltage load and determines the offset value or constant by a neural network in this example. The switch 684 has an input 784 that is coupled to the output of the digital to analog converter 766 and an input 786 that is coupled to a low power rail 788.

On the connection of a hot-plugging node or a HDD backplane, the corresponding BMC 772 can measure the DC power voltage level of the hot-plugging node by a system management bus interface to read the voltage value output by the ADC 776. The BMC 772 can report the voltage to the CMC 680 by an IPMB interface. The CMC 680 will read every voltage value for all connected nodes and the HDD backplane to calculate the voltage-drop value based on a maximum voltage drop from each of the voltage drops from the nodes. The compensation algorithm limits the compensation so it does not exceed the maximum output of the PSUs.

Referring to FIG. 7B, the voltage drop compensation algorithm 762 implements intelligent virtual remote sensing to compensate for voltage drops caused by the resistance of power-path transmission lines and node load variations in a multi-node system. When a hot-plugging node is not connected, the switch 684 will switch or keep the input 786 connected to the output 754. Thus, the feedback output of the operational amplifier 690 will allow compensation of the voltage drop from the output terminals of the PSUs 652 to the PDB 656 in FIG. 6B. At the default location, the CMC 680 also can use the ADC 764 to get the voltage signal from the positive power rail 752 to calibrate itself for more accurate detection and compensation. When any load, such as a server node or a HDD backplane, is inserted and powered up to start consuming power, the CMC 780 will control the switch 684 to switch the output 754 from being connected to the input 786 to the input 784 for intelligent virtual remote sensing. The CMC 780 can use the output of the DAC 766 to output a lower voltage signal to control the power output of the PSUs 652 to achieve voltage drop compensation by remote sensing.

Figure 8A:
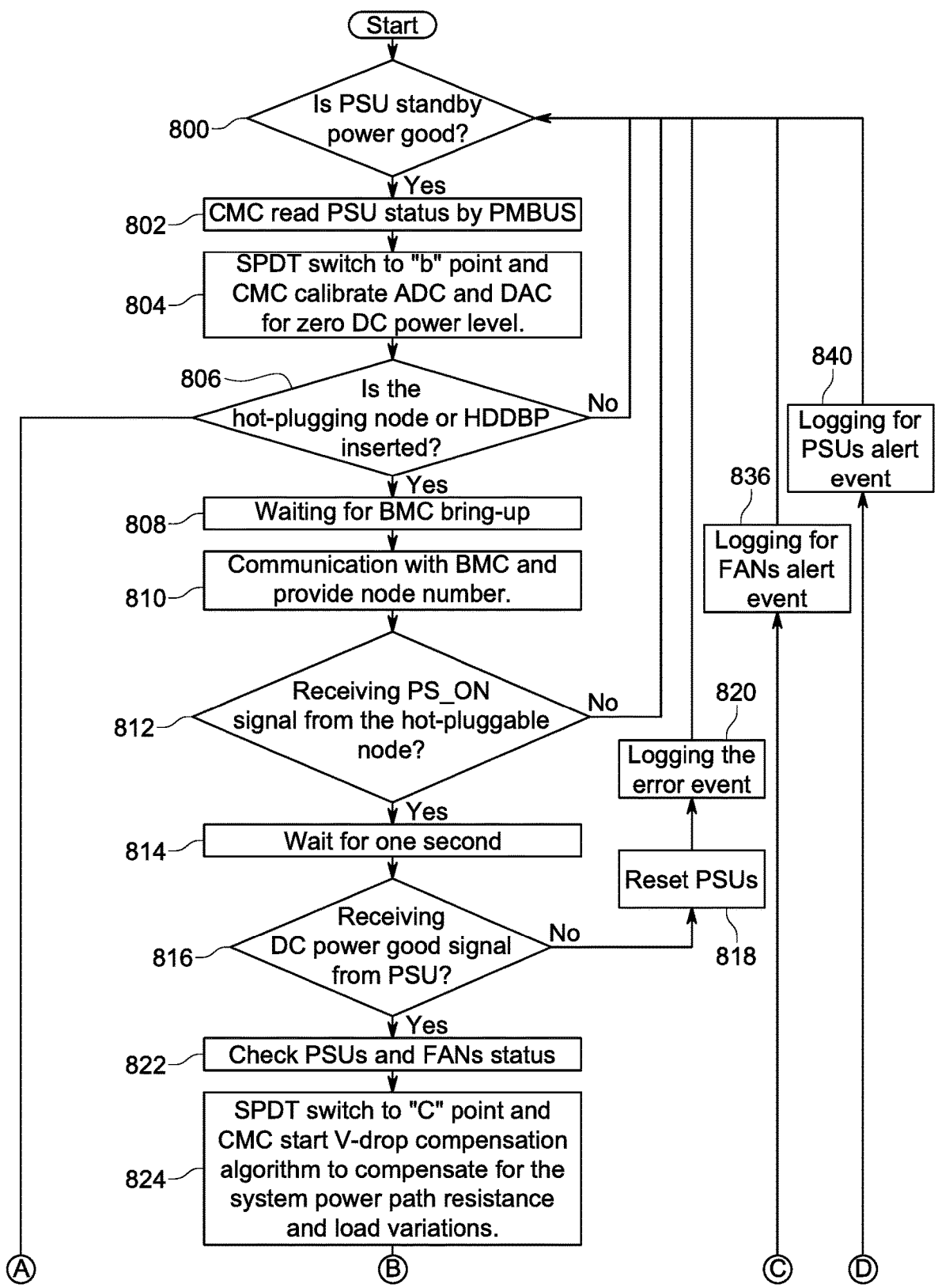
FIGS. 8A-8B are a flow diagram of the routine executed by the CMC in the system shown in FIG. 5 on startup.
Figure 8B:
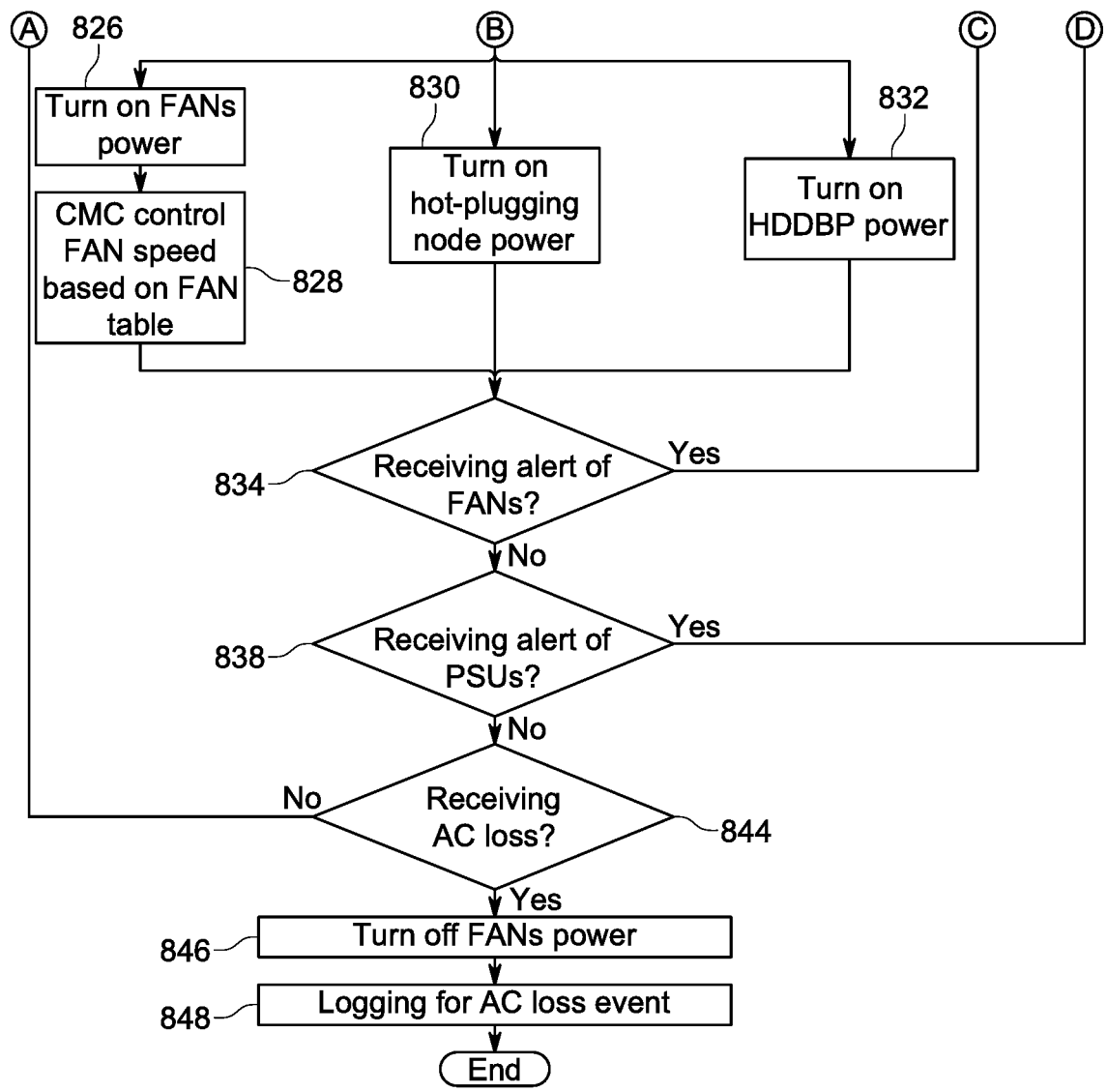

FIGS. 8A-8B are a flow diagram of an example intelligent routine executed by the CMC 520 in FIG. 5 for regulating supply voltage levels a multi-node system. The example intelligent routine includes traditional power up features, intelligent voltage-drop compensation for hot-plugging nodes, and prediction of health status for the system by resistance (R) of the routing path (e.g., for nodes, fans, HDD backplanes, or the power distribution board). The prediction of health status based on calculated resistance may be obtained for the printed circuit boards or mechanical components of the system. The status of such components may be shown on a web user interface to highlight the aging rate of different components. This may allow an operator to predict when certain components must be replaced. The example intelligent routine may also use voltage drop information to teach a multi-layer perceptron (MLP) neural network as will be explained below.

The CMC 520 first determines whether standby power to supply power to the CMC 520 and the BMC 540 is enabled by the PSUs 510, 512, 514, and 516 (800). The CMC 520 then reads the status of each of the PSUs 510, 512, 514, and 516 via a power management bus (802). The CMC 520 then activates the switch 524 to connect the input to the CMC 520 to calibrate the ADC and DAC on the CMC 520 for zero DC voltage level (804). The CMC 520 then determines whether a hot plugging node or a HDD backplane has been connected (806). If there is no connection, the routine returns to checking PSU standby power (802). If a hot plugging node has been connected, the CMC 520 waits for the BMC 540 of the node to get on line (808). The CMC 520 then communicates with the BMC 540 and provides a node number (810).

The CMC 520 then determines whether it is receiving a power on signal from the node (812). If no signal is received, the routine loops back to determining whether standby power is available (802). If a power on signal is received, the CMC 520 pauses for a predetermined amount of time, such as one second (814). The CMC 520 then determines whether it is receiving a DC power good signal from the PSUs 510, 512, 514, and 516 (816). If no DC power good signal is received, the CMC 520 will reset the PSUs 510, 512, 514, and 516 (818). The CMC 520 will then log an error event (820) and then loop back to determining whether standby power is available (802).

If the DC power good signal is received from the PSUs 510, 512, 514, and 516, the CMC 520 performs a status check on the fans board 552, and the PSUs 510, 512, 514, and 516 (822). The CMC 520 then actives the switch 524 to switch the input to the DAC output of the CMC 520. The CMC 520 then starts the voltage drop compensation algorithm to compensate for the power path resistance (816). The CMC 520 then turns on power to the fans on the fan board 552 (826). The CMC 520 controls the fan speed based on a stored fan table to provide the required cooling of the nodes (828). The CMC 520 turns on the power to the hot-plugging node (830). The CMC 520 then turns on the power to the HDD backplane 550 (832).

The CMC 520 determines whether an alert is received for the fans (834). If an alert is received, the CMC 520 logs a fan alert event (836). The routine then loops back to determine whether start up power is available (802). If no alert for fans is received, the CMC 520 determines whether an alert is received for the PSUs (838). If an alert is received, the CMC 520 logs a PSU alert event (840). The routine loops back to determine whether startup power is available (802). If no PSU alerts are received, the CMC 520 determines whether the PSUs are receiving any AC power loss (844). If AC power loss is detected, the CMC 520 will turn off power to the fans board 552 (846). The CMC 520 will then log an AC power loss event (848). If no AC power loss is detected, the CMC 520 will loop back and determine if a hot-plugging node is connected (806). The CMC 520 will determine node connection periodically to insure that voltage compensation is performed if loads change.

Figure 9:
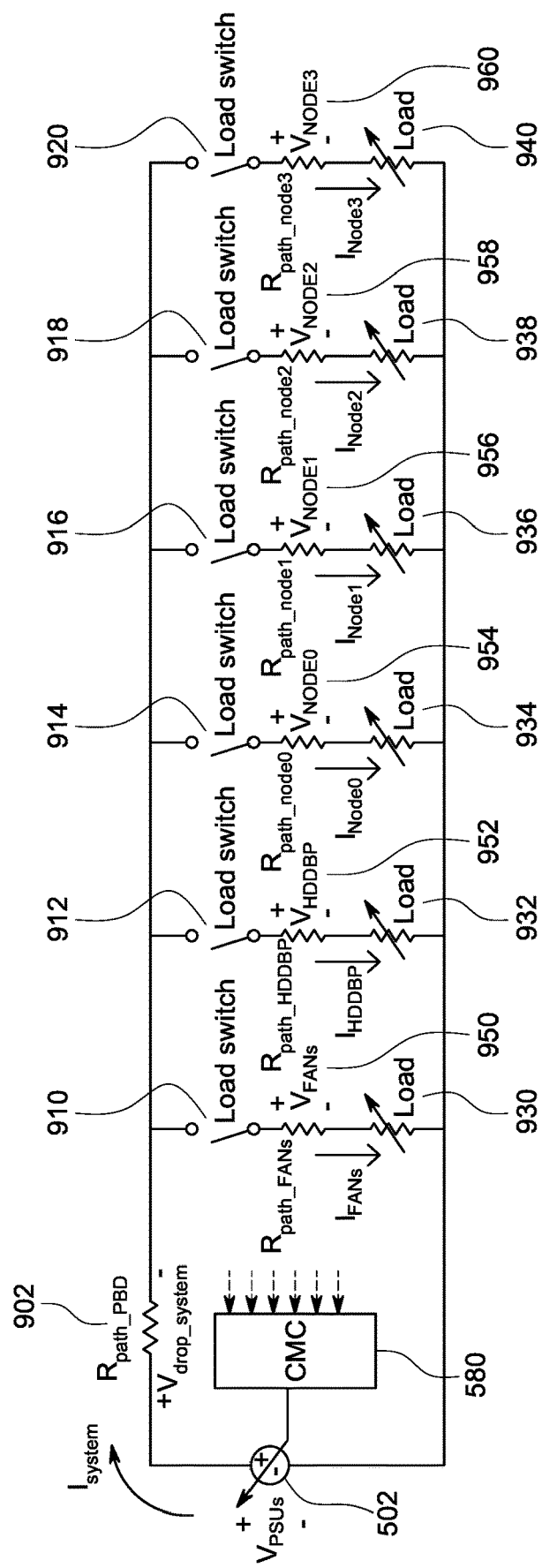
FIG. 9 is an equivalent circuit diagram of the loads on a multi-node system.

FIG. 9 illustrates a 2U/4N chassis system equivalent circuit 900 of the multi-node system 500 in FIG. 5. A resistor 902 represents the resistance of the power paths to the nodes.

A load switch 910 is connected to a load 930 representing the fans board 552 in FIG. 5. A load switch 912 is connected to a load 932 representing the HDD backplane 550 in FIG. 5. Four load switches 914, 916, 918, and 920 are connected to respective loads 934, 936, 938, and 940, representing the nodes 530, 532, 534, and 536 in FIG. 5. The load switches 910, 912, 914, 916, 918, and 920 are electronic relays that can be used to control on/off timing of the power supply rails in the system 500 when the system is powered up. In this example, the load switches 910, 912, 914, 916, 918, and 920 are on the power distribution board 504 in FIG. 5. The CMC 580 controls the switching signals to the load switches 910, 912, 914, 916, 918, and 920 to power on different nodes. If the load switches are omitted, power up of the nodes of the system 500 will cause an inrush current that may damage system components as no over current protection through changing voltage levels is provided. Therefore, in this example the CMC 580 in FIG. 5 will control and enable timing of each load switch 910, 912, 914, 916, 918, and 920 to avoid inrush current and reduce voltage drop. When the components of the system 500 in FIG. 5 are powered up separately, the CMC 580 can receive voltage drop values from different remote locations, such as the fans board 552, the HDD backplane 550 and the nodes 530, 532, 534, and 536. The CMC 580 can read current values from the PSUs 502. Thus, the CMC 580 may thus determine the resistance of the paths to the fan board 552, HDD back-plane 550, and nodes 530, 532, 534, and 536 in FIG. 5 through the read voltage drops and current values. These calculated resistances are represented by resistances 950, 952, 954, 956, 958, and 960 in FIG. 9.

Figure 10:
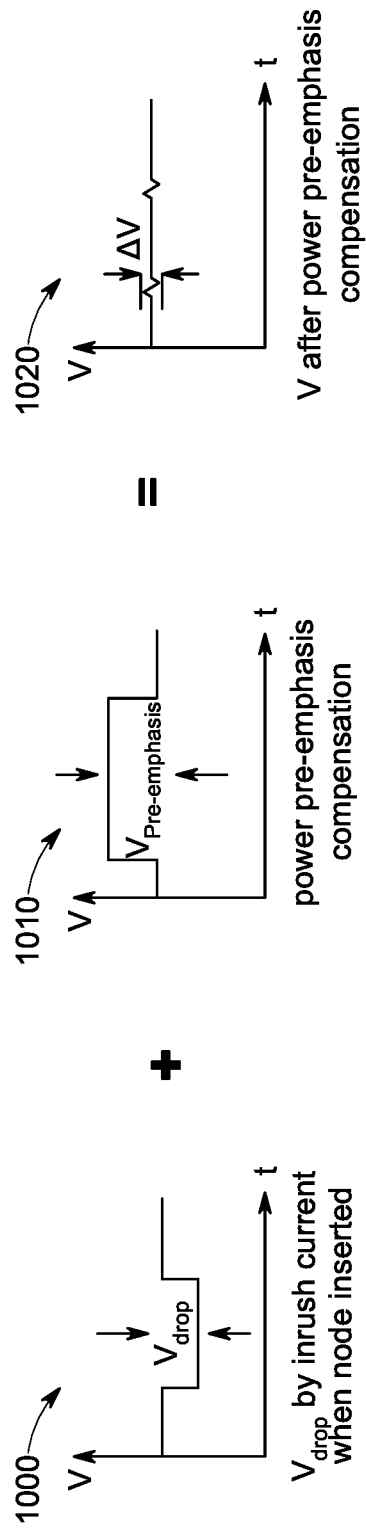
FIG. 10 are voltage diagrams of power signals applied to prevent over voltages caused by inrush current to a load after inserting a hot plugging node.

As will be explained below, the resistances may be input to a MLP neural network run by the CMC 580 to output a $K_{compensation\_biase}$ value to the voltage drop compensation algorithm. The $K_{compensation\_biase}$ value may be used to compensate for the effects of aging on mechanical components such as power connectors or cables or an AIRMAX connector. Such aging may increase the resistance of such components, resulting in greater voltage drops over time. When a hot-plugging node is inserted and powered up, the CMC 580 will provide pre-emphasis voltage to avoid the voltage drop caused by an inrush current. FIG. 10 shows a series of voltage levels that may occur when a hot-plugging node is inserted. A voltage diagram 1000 shows a voltage drop caused by inrush current when a hot plugging node is inserted. A voltage diagram 1010 shows a pre-emphasis signal that includes an increase in voltage supply level regulated by the CMC 580 in FIG. 5 for a certain interval. A voltage diagram 1020 shows the resulting voltage drop after application of the pre-emphasis signal 1010. As shown in the voltage diagram 1020, after the pre-emphasis voltage signal compensates the voltage drop during power up, the system power will have a much smaller power ripple and noise. This smaller power ripple is shown as ΔV<100 mV in the voltage diagram 1020.

Figure 11:
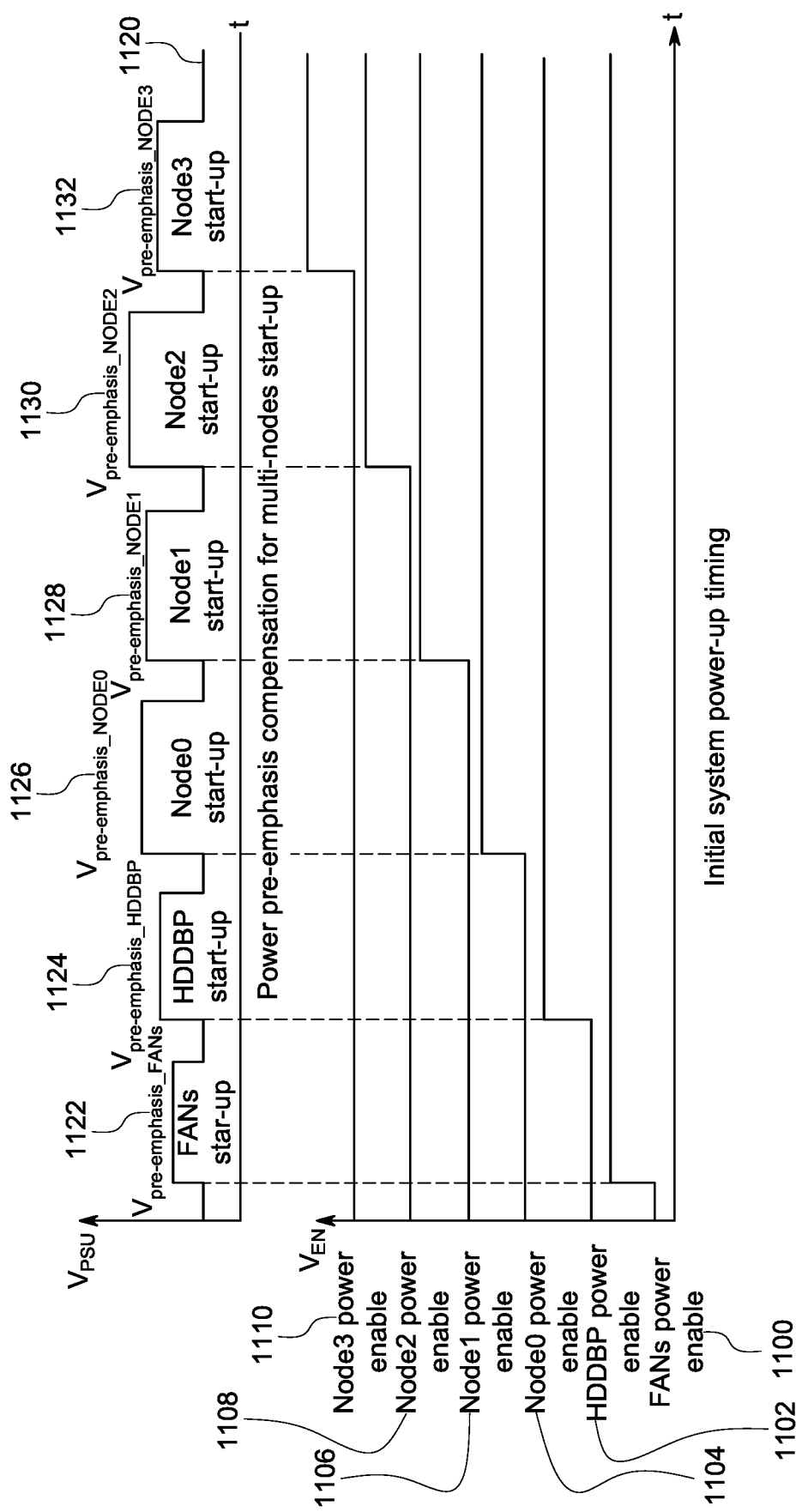
FIG. 11 is a voltage timing diagram of enable signals and power signals during power up of components in a multi-node system.

FIG. 11 shows a voltage timing diagram of resulting pre-emphasis voltages applied as controlled by the CMC 580 in the system 500 in FIG. 5 to prevent voltage drops from in rush currents. As shown in FIG. 11, different enable signals are turned on to activate different components. A first enable signal 1100 turns on the fans board 552. A second enable signal 1102 is then activated to turn on the HDD backplane 550. The nodes 530, 532, 534, and 536 are then turned on in sequence by enable signals 1104, 1106, 1108, and 1110.

During the sequence of enable signals, the CMC 580 adjusts the voltages to the system as shown by a trace 1120 to compensate for inrush currents. Thus, when the enable signal 1100 is turned on for the fans board 552, a pre-emphasis level 1120 is activated to compensate for the resulting voltage drop. When the enable signal 1102 is turned on for the HDD back-plane 550, a pre-emphasis level 1122 is activated to compensate for the resulting voltage drop. The supply signal is increased to additional pre-emphasis levels 1124, 1126, 1128, and 1130 when each of the respective enable signals 1104, 1106, 1108, and 1110 are activated. As may be seen in FIG. 11, the pre-emphasis levels 1122, 1124, 1126, 1128, and 1130 are different depending on the learned necessary levels to compensate for the inrush current specific to the component coming on line.

Figure 12A:
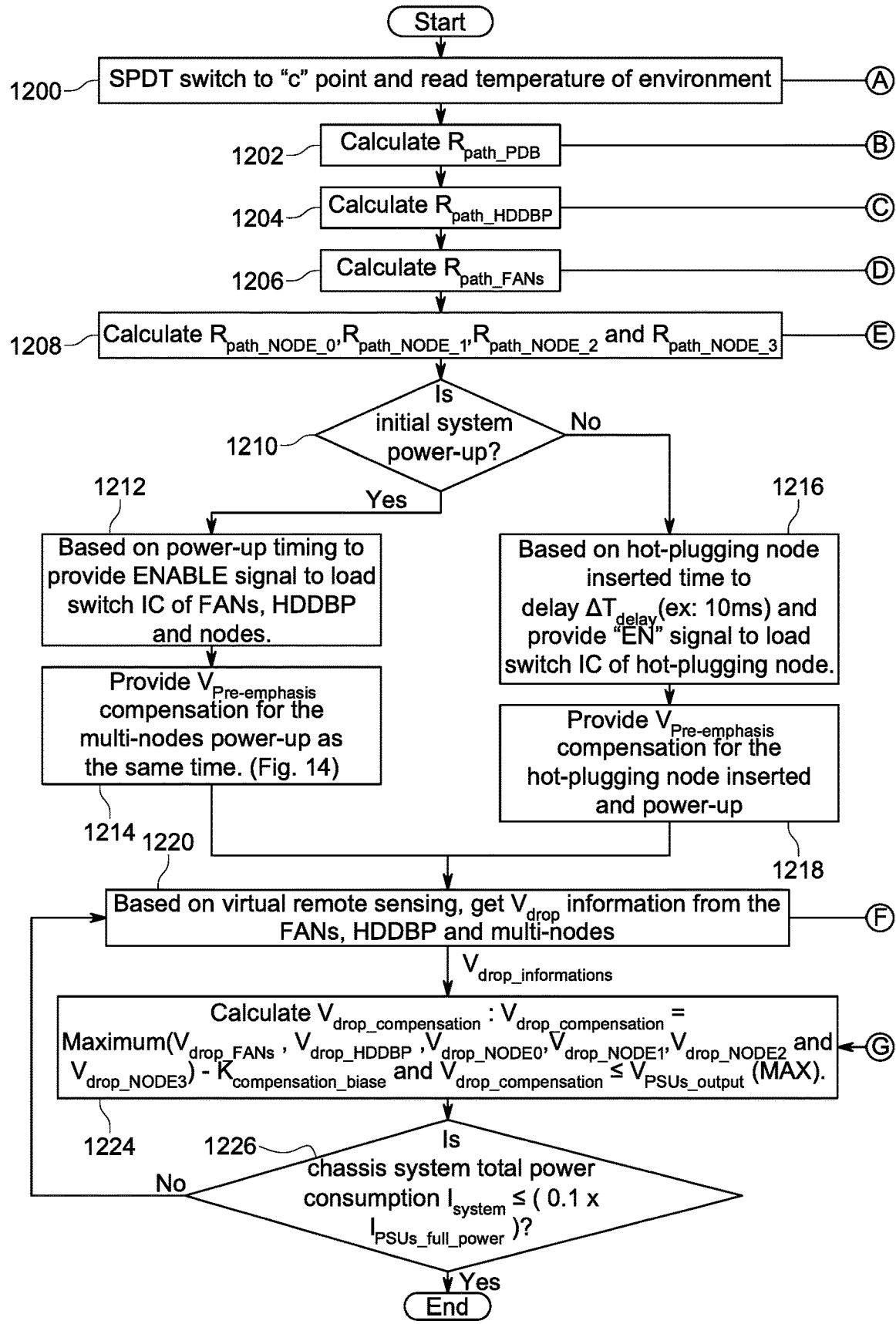
FIGS. 12A-12B are a flow diagram of the routine executed by the CMC to determine applied voltage compensation levels.
Figure 12B:
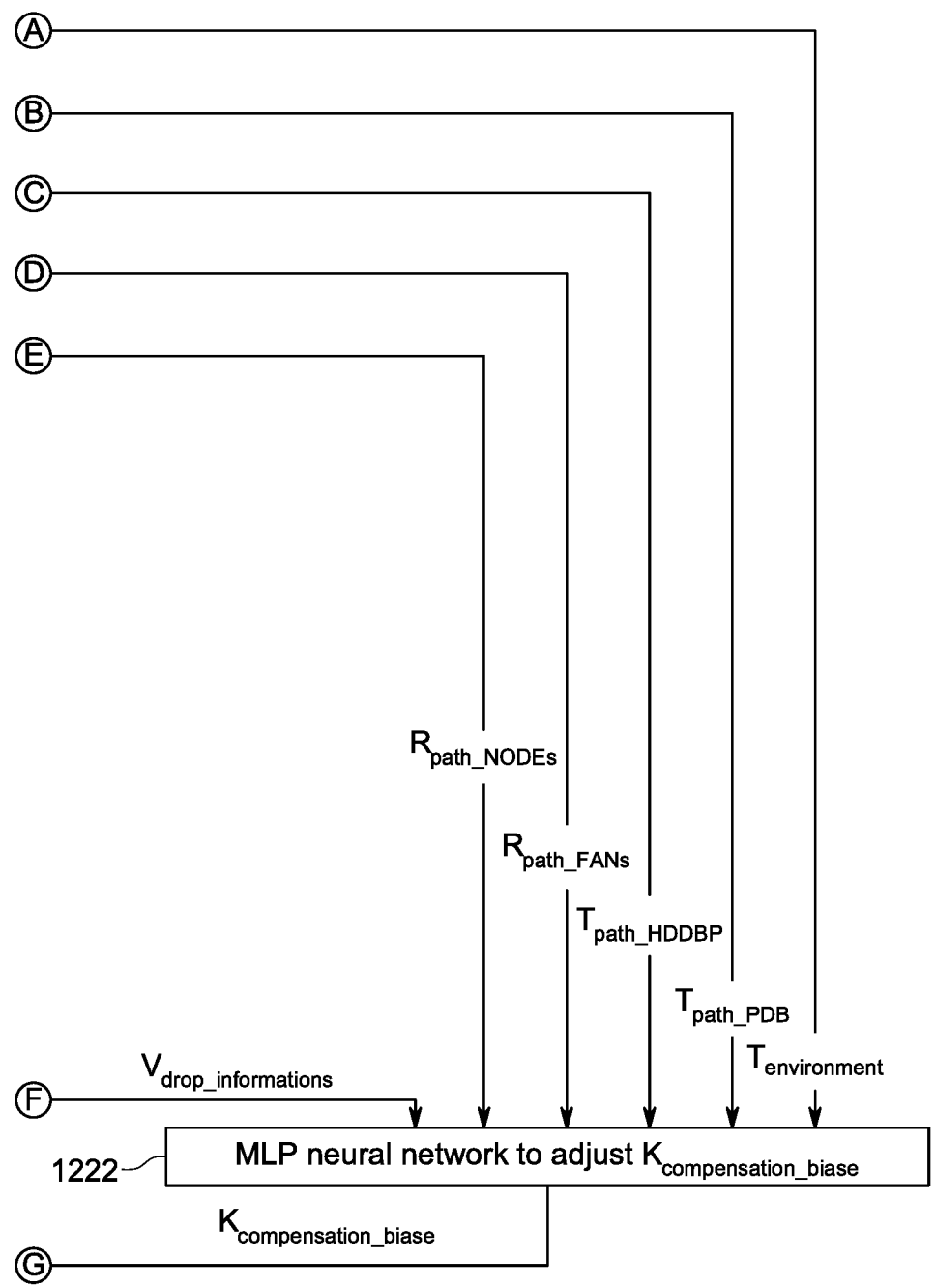

FIGS. 12A-12B are a flow diagram of the process that determines parameters for adjusting power on startup for the system 500 in FIG. 5. First, the switch 524 is connected to the input reflecting the voltage drop of remote components such as the nodes or the fan board (1200). The CMC 580 calculates the path resistance of the power distribution board based on the input current and the sensed voltage (1202). The CMC 580 then calculates the path resistance to the HDD backplane 550 based on the input current and the sensed voltage (1204). The CMC 580 then calculates the path resistance to the fans board 552 based on the input current and the sensed voltage (1206). The CMC 580 then calculates the path resistance of each of the nodes based on the input current and the respective sensed voltages (1208).

The CMC 580 then determines whether the system has been initially powered up (1210). If the system is powered up, the CMC 580 initiates the sequence of the enable signals as shown in FIG. 11 to the fans board 552, HDD backplane 550, and nodes 530, 532, 534, and 536 (1212). The CMC 580 then provides voltage compensation in the form of pre-emphasis voltage levels for each of the enable signals (1214). If the system is not powered up, the CMC 580 reads the delay time for a hot-plugging node and provides the enabled signal to a node (1216). Thus, for initial system power up with hot-plugged nodes installed in the chassis, the CMC 580 will base the timing in the regular power-up routine to enable a load switch for the node. Thus, the CMC 580 will base the timing of activating the load switch and the pre-emphasis voltage setting of the load switch from the output voltage from the power supply units to avoid inrush currents and voltage drop effects. When one of the hot-plugged nodes is already powered up in the chassis system and a user wants to insert another node to the system, the CMC 580 will delay enabling the load switch to avoid an inrush current or voltage drop and increase the voltage level ($V_{Pre-emphasis}$) by controlling the feedback signal to the PSU. The CMC 580 then provides voltage compensation for the enable signal (1218). The CMC 580 then reads remotely sensed voltages from the BMCs on the nodes 530, 532, 534, and 536, and from the HDD back-plane 550, and from the fan board 552 (1220).

The remotely sensed voltage information from step 1220 and the resistances determined from steps 1202, 1204, 1206, and 1208 are fed to a neural network to determine the compensation base (1222). The computed compensation base and the remote sensed voltage information are then used to determine voltage drop compensation (1224). The voltage drop compensation is determined as the largest of the remote voltages and the compensation base value so it does not exceed the maximum power output of the PSU. The voltage drop compensation is performed in real time by the neural network run by the CMC 580. The CMC 580 also determines whether the total power consumption is less than the full power of the PSUs (1226). If the total power consumption is less than the full power, the routine ends. If the total power consumption is greater than the full power, the routine loops back to determine remote sensing voltage (1220). Thus, when the system is running and system loading is random, the CMC 580 will get voltage drop information by serial communication with voltage sensors on the FANs board 552 or HDD back-plane 550. The real time voltage drop information will be input to the neural network.

Figure 13:
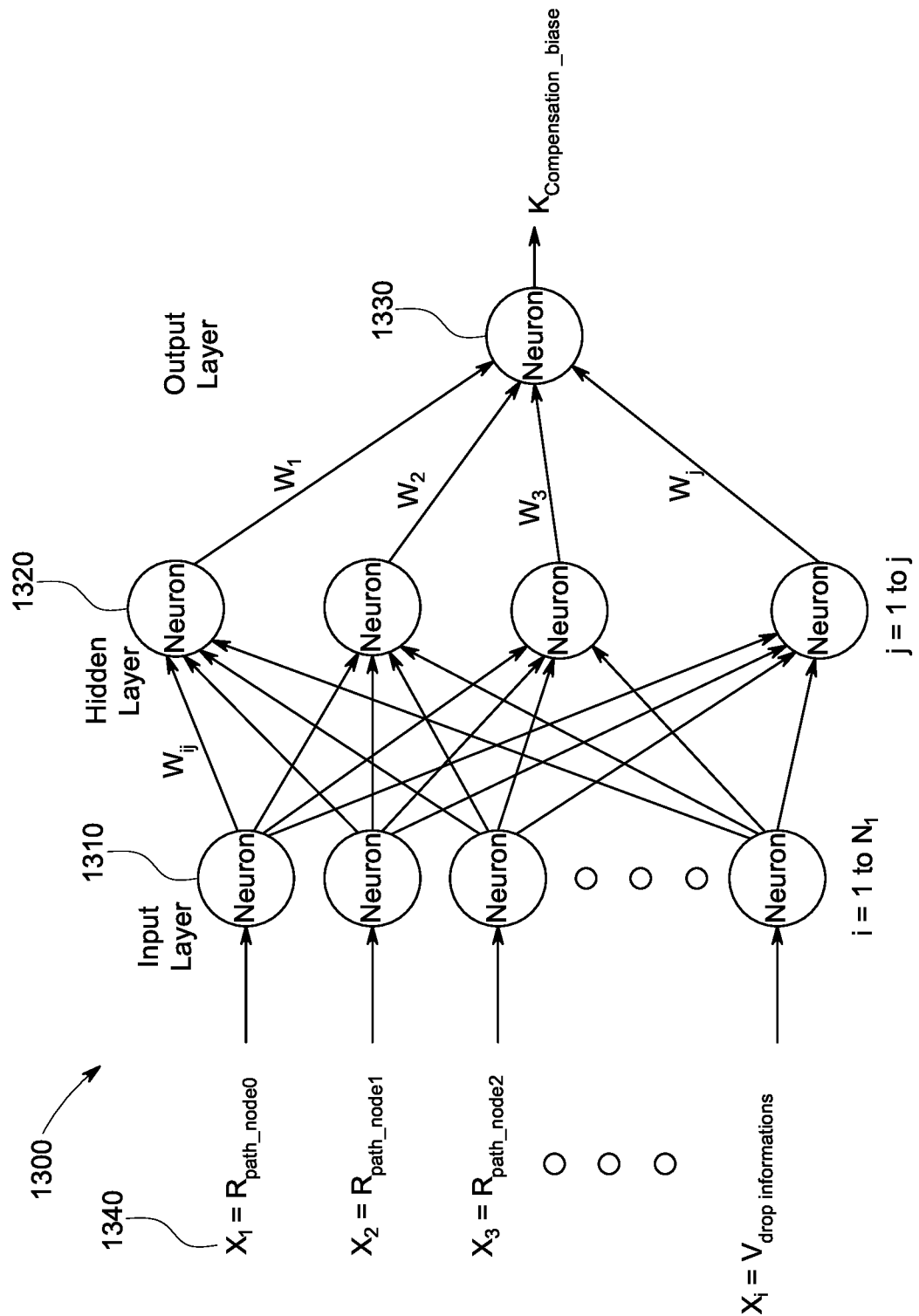
FIG. 13 is a neural net used to learn the optimal voltage compensation levels.

A CMC or BMC may use parameters of voltage drops and resistances of the power path as multi-layer perceptron (MLP) neural network inputs. Based on the results of a MLP neural net, predictions of health status of the power path including connector connections and printed circuit board routing may be obtained as well as pre-emphasis voltage levels to protect against inrush currents. An example MLP neural network 1300 is shown in FIG. 13. The neural network 1300 is a feed forward artificial neural network. The MLP neural network 1300 consists of at least three layers of nodes. A first set of nodes 1310 constitute an input layer, a second set of nodes 1320 constitute a hidden layer, and a third set of nodes 1330 constitute an output layer. As shown in FIG. 13, input values 1340 to the input layer nodes 1310 constitute resistances of the nodes 530, 532, 534, and 536 in FIG. 5, as calculated by the CMC 580, and voltage drop information as reported by each BMC of each node. Each input layer node 1310 and hidden node 1320 is a neuron that uses a nonlinear activation function such as a sigmoid or soft-max function to determine an output value. The output node 1330 in this example, outputs the $K_{compensation\_biase}$ value based on the weighing the effect of the different inputs.

Figure 14:
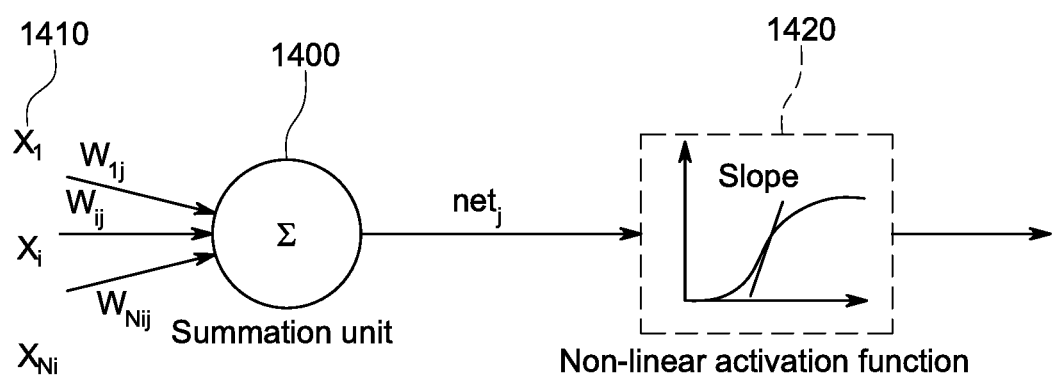
FIG. 14 is a node of the neural net in FIG. 13 that is used to determine optimal weighting for the learning process of the neural net.

FIG. 14 shows an example hidden layer node 1400. The hidden layer node 1400 has a series of inputs 1410 that are output by the input layer nodes 1310 in FIG. 13. As shown in FIG. 13, the outputs of all of the input layer nodes are input to each of the hidden layer nodes 1320. The outputs are based on weighting vector values that are proportional to the importance of the input values. In this example, the hidden layer node 1400 is a summation function that produces a nonlinear activation function 1420.

The MLP neural net 1300 in FIG. 13 will train the weighting vectors according to a back propagation algorithm. The predictive health algorithm is based on supervised learning based on a training data set. The training set includes the desired solution, called labels, for the neural net 1300 to learn weight vectors such as Wlj, Wij, and WNj for each of the hidden nodes such as the node 1400 shown in FIG. 14. This mechanism algorithm learning from the training dataset is analogous to a teacher supervising the learning process. With the correct answers, the algorithm iteratively makes predictions on the training data and is corrected by the teacher. Learning stops when the algorithm achieves an acceptable level of performance.

Figure 15:
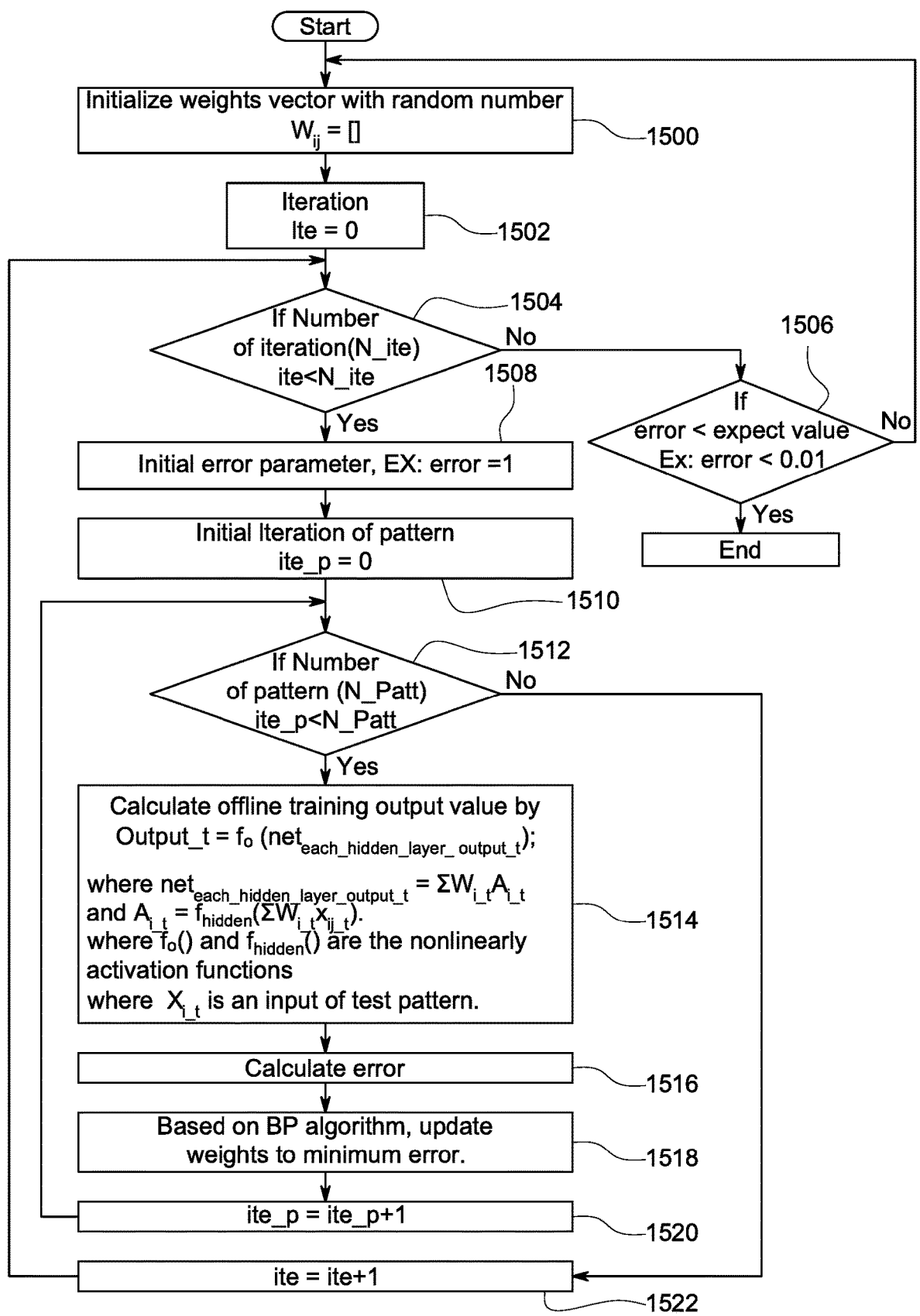
FIG. 15 is a flow diagram of the training process used to train the neural net of FIG. 13.

FIG. 15 shows a flow diagram of the back propagation routine for training the MLP neural net 1300 to calculate the compensation the $K_{compensation\_biase}$ value. The weights vector for the hidden nodes 1320 are initialized with random numbers (1500). An iteration counter is set to zero (1502). The routine determines whether the number of iterations is less than the number of iterations representing one complete pass through the training data set (an epoch) (1504). If the iterations are greater than the number of iterations for the epoch, the routine determines whether the error is less than the expected acceptable error value (1506). If the error is less than the expected value, than the routine ends. If the error is greater than the expected value, the routine loops back to initialize the weights with random numbers (1500).

If the iterations are less than the number of iterations in the epoch, the routine initializes an error parameter value (1508). The routine then sets the initial iterations of a pattern to zero (1510). The routine then determines whether the number of patterns is less than the number of the training data set batch (1512). The routine then determines the off line training output value as a function of the outputs of each of the hidden node outputs from the training set input values (1514). In this example, the output value, output_t=$f_O$ ($net_{each\_hidden\_layer\_output\_t}$). The $net_{each\_hidden\_layer\_output\_t}=\Sigma W_{j\_t} A_{j\_t}$ and $A_{j\_t}=f_{hidden}(\Sigma W_{ij\_t} x_{i\_t})$, $f_O(\ )$ and $f_{hidden}(\ )$ are the nonlinearly activation functions and $X_{i\_t}$ is the input of a test pattern. The routine then calculates the error (1516). The routine then updates the weights to minimize error based on the back propagation algorithm. The routine then adds one to the pattern iteration value (1520) and loops back to determine whether the iterations has reached the maximum (1512).

If the number of pattern iterations has reached the maximum (1512), the routine adds one to the number of iterations (1520) and loops back to determining whether the number of iterations has reached the maximum (1504).

Figure 16:
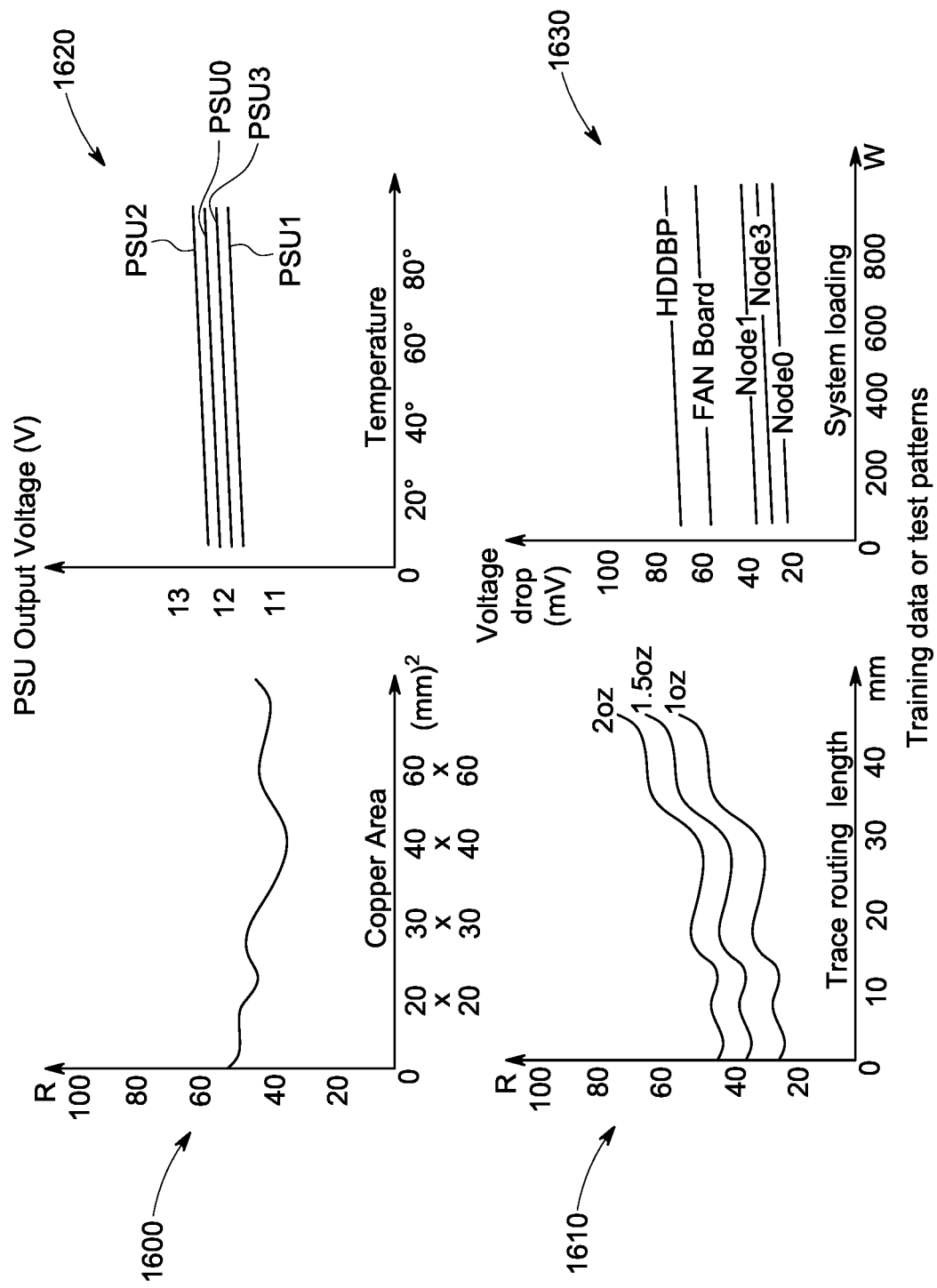
FIG. 16 are a series of plots of training data used in the training process in FIG. 15.

FIG. 16 shows a series of graphs relating to example training set data for training the MLP neural net 1300 in FIG. 13. FIG. 16 includes a graph 1600 that plots data points for copper area in relation to resistance. FIG. 16 includes a graph 1610 that plots different weights of trace lengths in relation to resistance. FIG. 16 includes a graph 1620 that plots the output voltage of different power supply units in relation to temperature. FIG. 16 includes a graph 1630 that plots the voltage drop created by different loads (e.g., nodes, HDD backplane, and fans board) consuming different power. The data points of the graphs 1600, 1610, 1620 and 1630 are all data derived from big data sets measured from systems. Since the dataset is extensive, cluster analysis, data mining and predictive analytics may be used to predict the system health status and the proper compensation for voltage drops. The results may be derived from the standard gradient descent approach to derive the back propagation learning algorithm for the MLP neural net 1300.

Figure 17:
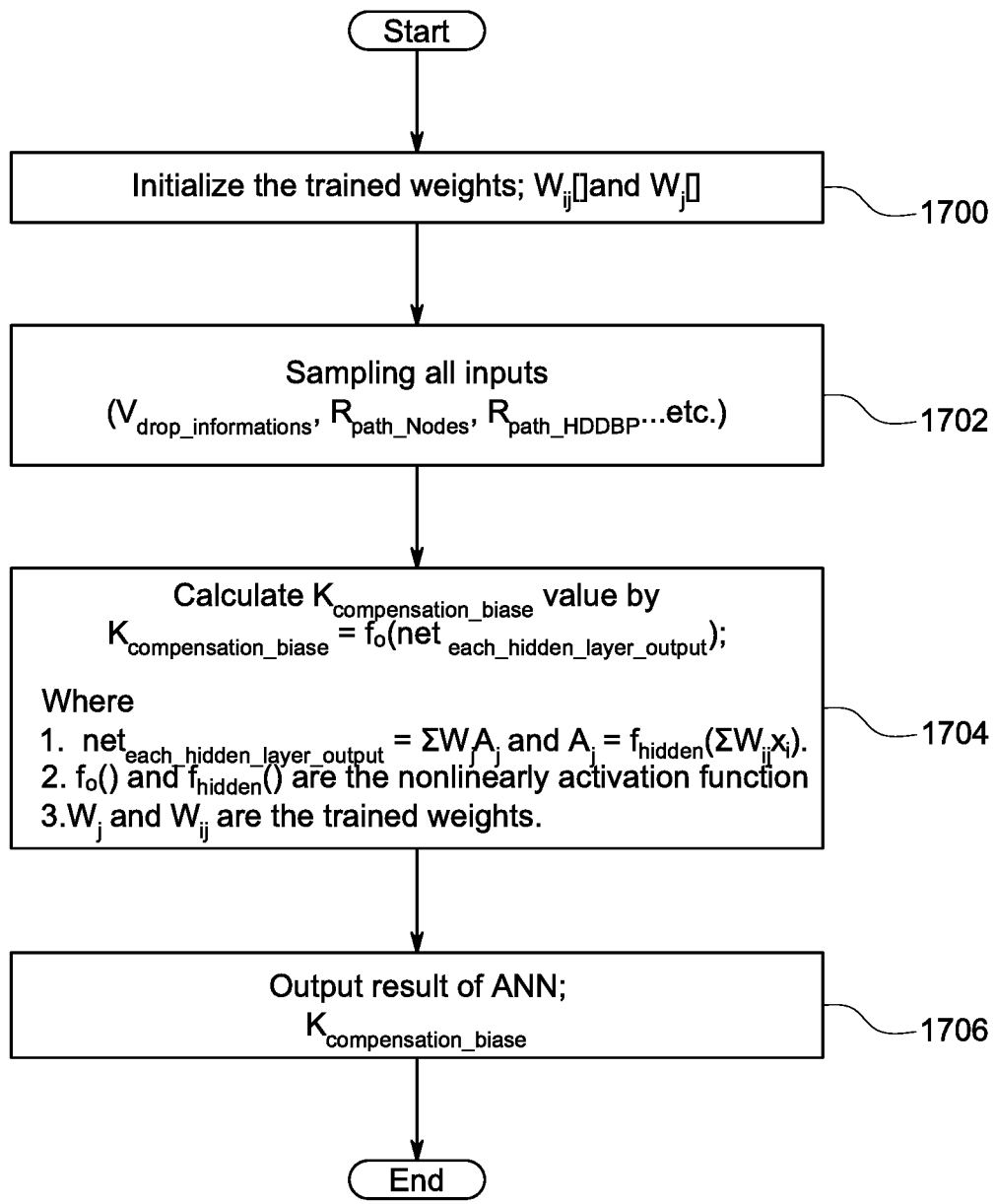
FIG. 17 is a flow diagram of the routine followed by the neural net in FIG. 13 to calculate a compensation value.

FIG. 17 shows a flow diagram of the routine used by the MLP neural net 1300 in FIG. 13 to determine the compensation value, $K_{compensation\_biase}$. The neural net 1300 first initializes the trained weights for the hidden nodes 1320 (1700). The neural net 1300 then samples all of the inputs such as the sensed voltage drop, and the path resistances of the nodes, HDD board, and fans board (1702). The neural net 1300 calculates the compensation value, $K_{compensation\_biase}$ as a function of each of the hidden layer node outputs (1704). The neural net 1300 then outputs the results of the function for the compensation value (1706).

The flow diagrams in FIGS. 8A, 8B, 12A and 12B are representative of example machine readable instructions for power up of system components for the CMC 580 in FIG. 5. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIGS. 8 and 12, persons of ordinary skill in the art will readily appreciate that many other methods of implementing the example machine readable instructions may alternatively be used. For example, the order of execution of the blocks may be changed, and/or some of the blocks described may be changed, eliminated, or combined.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A voltage compensation system for voltage drops in a device having a remote node, the voltage compensation system comprising:
    a power supply unit having an adjustable voltage output and a feedback circuit, wherein the voltage output is adjusted based on an output of the feedback circuit;
    a power path coupled to the power supply unit, wherein the power path is operable to supply voltage from the power supply unit to the remote node;
    a first switch having a switch output coupled to the feedback circuit, the first switch switching the switch output between a first input coupled to the power path, and a second input coupled to the remote node; and
    a controller coupled to the first switch, wherein the controller is operable to control the first switch to switch between the inputs to cause the feedback circuit of the power supply unit to compensate the voltage output for a voltage drop on the power path or the remote node.

2. The system of claim 1, further comprising a power distribution board, wherein the first switch and controller are on the power distribution board, and wherein the controller is a chassis management controller.

3. The system of claim 1, wherein the remote node is one of a server, a storage device backplane, or a fans board.

4. The system of claim 1, further comprising an enable power switch, wherein the controller is operable to:
    control the enable power switch to supply voltage to the remote node to power up the remote node;
    control the first switch to switch to the second input coupled to the remote node when the remote node is powered up; and
    increase the voltage output of the power supply unit to a pre-emphasis level to compensate for inrush current.

5. The system of claim 4, wherein the controller determines a path resistance of the remote node based on sensing a current from the power supply unit and the voltage drop.

6. The system of claim 5, wherein the determined path resistance is used as an input to a neural network to determine the pre-emphasis voltage output to compensate for inrush current, wherein the neural network includes weight vectors determined from training through a training set of data.

7. The system of claim 1, wherein the feedback circuit is an operational amplifier.

8. The system of claim 1, wherein the remote node includes a baseboard management controller operable for sensing the voltage drop from the remote node.

9. The system of claim 8, wherein the baseboard management controller sends voltage drop data to the controller via a bus.

10. The system of claim 9, wherein the controller includes an analog to digital converter having an input and an output, wherein the voltage drop data received by the controller is coupled to the input of the analog to digital converter, and wherein the output of the analog to digital converter is coupled to the second input of the first switch.

11. The system of claim 1, wherein the remote node is one of a plurality of remote nodes, and wherein the controller is operable to sum a corresponding plurality of voltage drops of the plurality of remote nodes, and wherein the sum of the corresponding plurality of voltage drops is connected to one of the inputs of the first switch.

12. A method of compensating remote voltage drops for a system having a power supply unit; a power path coupled to the power supply unit; a remote node powered by the power supply unit through the power path; and a first switch having an output coupled to a feedback circuit, a first input coupled to the power path and a second input coupled to the remote node, the method comprising:

switching the first switch to the second input via a controller to determine a voltage drop from the remote node;

outputting a feedback signal based on the voltage drop from the remote node to the power supply unit; and adjusting a voltage level of the power supply unit based on the feedback signal to compensate for the voltage drop.

13. The method of claim 12, wherein the system includes a power distribution board, and wherein the first switch and controller are on the power distribution board, and wherein the controller is a chassis management controller.

14. The method of claim 12, wherein the remote node is a server, a storage device backplane, or a fans board.

15. The method of claim 12, further comprising:
controlling an enable power switch to supply voltage to the remote node to power up the remote node;
controlling the first switch to switch to the second input coupled to the remote node when the remote node is powered up; and
increase the voltage output to a pre-emphasis level to compensate for inrush current.

16. The method of claim 15, further comprising:
sensing a current from the power supply unit; and
determining a path resistance value of the remote node based on the sensed current and the voltage drop.

17. The method of claim 16, wherein the pre-emphasis level to compensate for inrush current is determined by a neural network, wherein the neural network includes weight vectors determined from training through a training set of data.

18. The method of claim 12, wherein the remote node includes a baseboard management controller operable for sensing the voltage drop from the remote node.

19. The method of claim 12, wherein the remote node is one of a plurality of remote nodes, and wherein the controller is operable to sum a corresponding plurality of voltage drops of the plurality of remote nodes, and wherein the sum of the corresponding plurality of voltage drops is connected to one of the inputs of the first switch.

20. A multi-node system comprising:
a power distribution board;
a power supply unit mounted on the power distribution board, the power supply unit including a feedback circuit and an adjustable voltage output;
a plurality of nodes including a computing node and a storage backplane node, each of the plurality of nodes coupled to the adjustable voltage output of the power supply unit;
a controller mounted on the power distribution board, wherein the controller receives voltage drop data from each of the plurality of nodes; and
a switch having a switch output representing a voltage drop coupled to the feedback circuit, the switch output switching between a first input coupled to the power distribution board and a second input coupled to the controller to receive voltage drop data from at least one of the plurality of nodes, wherein the power supply unit adjusts the voltage output to compensate for voltage drops received by the feedback circuit.

* * * * *